(12) United States Patent
Chen

(10) Patent No.: US 12,429,692 B2
(45) Date of Patent: Sep. 30, 2025

(54) HEAD-UP DISPLAY USING BACKLIGHT TO CONTROL EYEBOX

(71) Applicants: Far Vision Technology Co., Ltd., Taichung (TW); E-LEAD ELECTRONIC CO., LTD., Changhua (TW)

(72) Inventor: Stephen Chen, Changhua (TW)

( * ) Notice: Subject to any disclaimer, the term of this patent is extended or adjusted under 35 U.S.C. 154(b) by 401 days.

(21) Appl. No.: 18/198,823

(22) Filed: May 17, 2023

(65) Prior Publication Data

US 2024/0385432 A1    Nov. 21, 2024

(51) Int. Cl.
*G02B 27/01* (2006.01)
*G02B 7/182* (2021.01)
*G02B 17/06* (2006.01)

(52) U.S. Cl.
CPC ....... *G02B 27/0101* (2013.01); *G02B 7/1821* (2013.01); *G02B 17/0642* (2013.01); *G02B 2027/0123* (2013.01)

(58) Field of Classification Search
CPC .............. G02B 27/0101; G02B 7/1821; G02B 17/0642; G02B 17/0812; G02B 2027/0123
USPC .......................... 359/858, 629, 630, 631, 633
See application file for complete search history.

(56) References Cited

U.S. PATENT DOCUMENTS

| | | | |
|---|---|---|---|
| 2017/0192234 A1* | 7/2017 | Lai ..................... | G02B 27/0101 |
| 2017/0235138 A1* | 8/2017 | Morohashi ............ | H04N 13/30 |
| | | | 359/631 |
| 2017/0357088 A1* | 12/2017 | Matsuzaki ......... | G02B 27/0149 |
| 2019/0033590 A1* | 1/2019 | Kasahara ................ | G06F 3/147 |
| 2019/0187475 A1* | 6/2019 | Omanovic ............. | G08G 1/166 |
| 2020/0271927 A1* | 8/2020 | Kawana ............... | G02B 5/0816 |
| 2020/0338987 A1* | 10/2020 | Ichikawa ............... | B60K 35/22 |
| 2023/0152510 A1* | 5/2023 | Sugiyama .......... | G02B 27/0101 |
| | | | 362/609 |
| 2023/0418056 A1* | 12/2023 | Chen .................. | G02B 27/0101 |

* cited by examiner

*Primary Examiner* — Ricky D Shafer
(74) *Attorney, Agent, or Firm* — Bruce Stone LLP; Joseph A. Bruce

(57) ABSTRACT

A head-up display using a backlight to control an eyebox, is applicable to being used with an imaging semi-reflective mirror, and includes a backlight source, a switchable adjustment mirror device, a backlight concave mirror, a display panel and an imaging concave mirror. The switchable adjustment mirror device is positioned at the light path between the backlight source and the backlight concave mirror and includes a plurality of mirrors having different curvatures, and each one of the mirrors can be selected to reflect the backlight beam from the backlight source to the backlight concave mirror. Accordingly, the position of the eyebox can be controlled to match with the position of the eyes of the viewer.

9 Claims, 24 Drawing Sheets

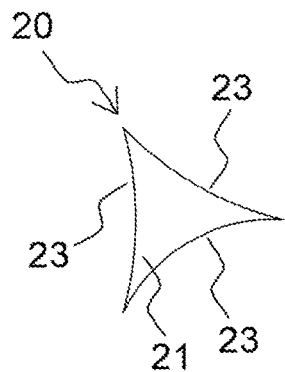 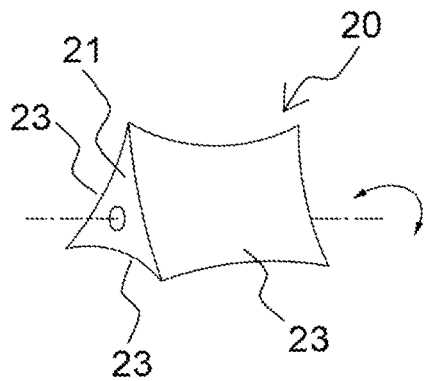
FIG.15A  FIG.15B
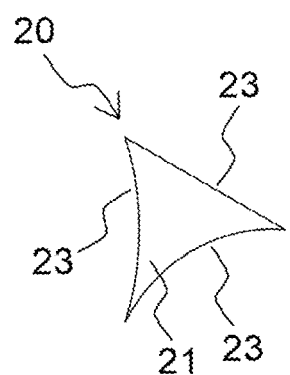 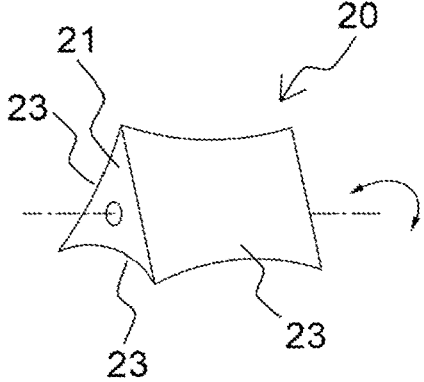
FIG.16A  FIG.16B
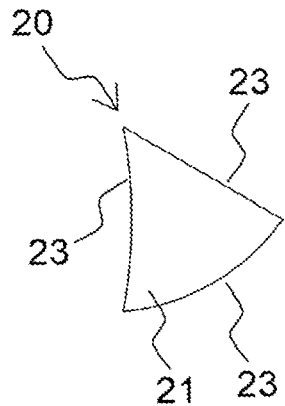 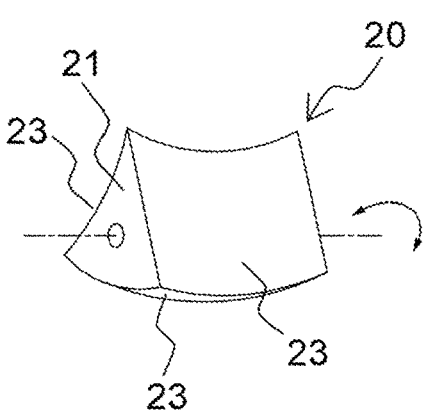
FIG.17A  FIG.17B

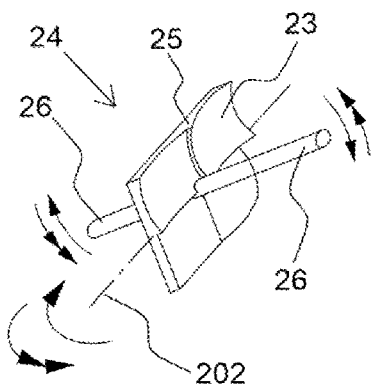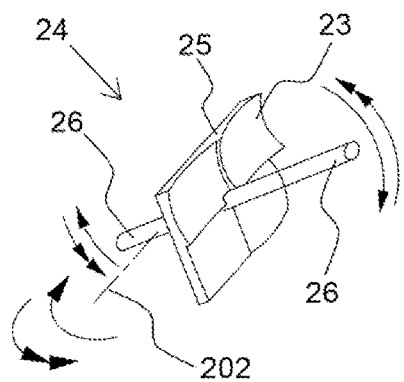
FIG.37A  FIG.37B
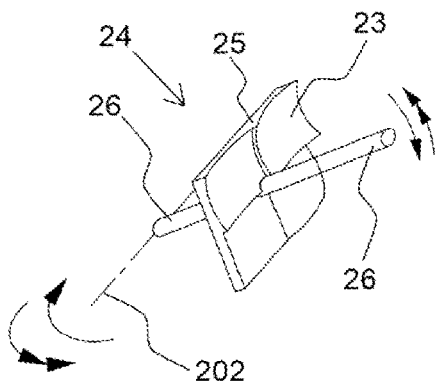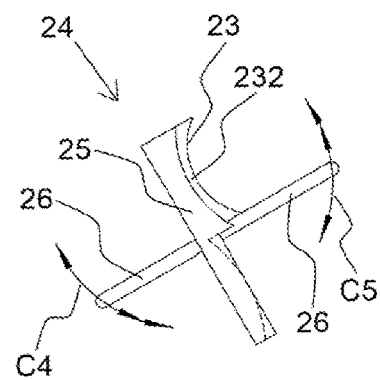
FIG.37C  FIG.37D
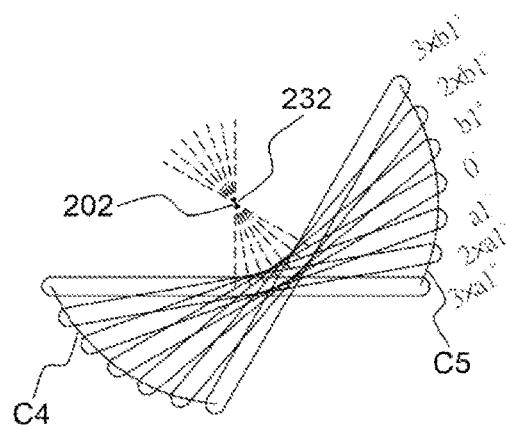
FIG.37E

HEAD-UP DISPLAY USING BACKLIGHT TO CONTROL EYEBOX

BACKGROUND

Technical Field

The present invention relates to a head-up display, and in particular, to a head-up display using backlight to control an eyebox.

Description of Related Art

As shown in FIG. 1A to FIG. 2C, the backlit display, such as a liquid crystal display (LCD), used by the picture generation unit PGU1 of a known head-up display typically includes a backlight source 1 and a display panel 4. The backlight source 1 is normally installed at the rear side of the display panel 4. To increase the distance and magnification of the presented image as well as reduce the change of the focal length of eyes in the light path design of a head-up display, the image projected by the picture generation unit PGU1 is reflected and magnified by the imaging concave mirror 5 for further projection to the eyes E of the viewer. Accordingly, the display panel 4 is arranged within the focal length of the imaging concave mirror 5, in order to form a display panel-based virtual image G that is magnified and is at a longer distance from the rear of the imaging concave mirror 5, and then, the display panel-based virtual image G is partially reflected by the imaging semi-reflective mirror 6 to the eyes E of the viewer. Consequently, the viewer is able to visually see the display panel-based virtual image G formed on one side of the imaging semi-reflective mirror 6 away from the viewer. The imaging semi-reflective mirror 6 can be a windshield 61 shown in FIG. 2A, or a combiner 62 shown in FIG. 2B, and can be used for reflecting a portion of the projected image light to the eyes E of the viewer while allowing a portion of front scenery light to penetrate therethrough to reach the eyes of the viewer at the same time.

To make an image projected by a head-up display equipped with the augmented reality function match with the actual scene at the front of the vehicle as much as possible, it is necessary to increase the imaging distance of the image as far as possible, such as 10 m, or even farther. For this, the display panel 4 is close to the focal point of the imaging concave mirror 5, and the closer the display panel 4 is apart from the focal point, the farther the imaging distance is.

Under such a condition, since the backlight source 1 is arranged behind the display panel 4, the backlight source 1 may be closer to the focal point of the imaging concave mirror 5, or even exceed the focal point. As shown in FIGS. 1A and 1B, when the backlight source 1 does not exceed the focal point F and is close to the focal point F, the light from the backlight source 1 of the picture generation unit PGU1 is reflected by the imaging concave mirror 5 to form a backlight source-based virtual image BL_im5 of a larger size at a longer distance from the rear side of the imaging concave mirror 5. Or, as shown in FIGS. 1A and 1C, when the backlight source 1 exceeds the focal point F and is close to the focal point F, the light from the backlight source 1 of the picture generation unit PGU1 is reflected by the imaging concave mirror 5 to form a backlight source-based real image BL_re5 of a large size at a longer distance from the front of the imaging concave mirror 5.

In addition, the imaging position of the backlight source-based real image is the area where all light intersect with each other, and a complete, clearest and brightest image can be viewed at this area, which is the best position for viewing the image and is also the position for the eyebox. Accordingly, the optimal design to increase the viewing brightness and optical efficiency is to form a backlight source-based real image (i.e., the eyebox) of a relatively small size at the eyes of the viewer.

As shown in FIGS. 2A and 2B, to allow the backlight source 1 to form a relatively smaller backlight source-based real image BL_re5 at the positions of the eyes E of the viewer, it is necessary to arrange the backlight source 1 to exceed and be away from the focal point of the imaging concave mirror 5 to reduce the image distance and the magnification power. Nevertheless, such a design causes the optical efficiency of the backlight source 1 to be reduced. As shown in FIG. 2C, the light beam projected by a backlight source 1 of low directivity arranged at a farther position has a greater diffusion angle such that only a small portion of the light beam penetrates through the display panel 4 and enters the eyebox of the viewer, which cases the brightness of the image viewed by the viewer is lower; and the space among elements is also greater.

The preferred method is to use the picture generation unit PGU2 as shown in FIGS. 3A and 3B, where the light emitted by the backlight source 1 arranged within the focal length the backlight concave mirror 3 is reflected by a backlight concave mirror 3 to the display panel 4 to form a backlight source-based virtual image BL_im3 that is magnified and is at a longer distance from the rear of the backlight concave mirror 3. Such a backlight source-based virtual image BL_im3 exceeds and is farther away from the focal point of the imaging concave mirror 5, and then, the backlight source-based virtual image BL_Im3 is further reflected by the imaging concave mirror 5 and the imaging semi-reflective mirror 6 to form a backlight source-based real image BL_re5 at the eyes E of the viewer. Accordingly, a smaller backlight source 1 can be used, and the distance among elements can be reduced. In addition, the light beam reflected by the backlight concave mirror 3 has high directivity, so that the optical efficiency can be increased.

However, the viewer in a car does not keep stationary, and the seat or the viewer's head may move or swing from side to side. Once the eyes E leave the position of the backlight source-based real image BL_re5, such as move forward and backward as shown in FIG. 4, the light will not be focused on the eyes E, and the brightness and quality of the image viewed by the viewer will be affected. If the seat or the head moves upward and downward or moves rightward and leftward, not only the brightness and quality of the image viewed will be affected, but also the viewer will see only an incomplete image, and even see nothing.

In general, there is a linkage relationship between the object and the image formed by the concave mirror. In other words, any change of the position of the backlight source 1 can cause change of the position of the backlight source-based real image correspondingly. To maintain the quality of the image viewed by the eyes E that have moved to another position, it is necessary to collocate a movable backlight source 1 and a backlight curved mirror BLC with fixed curvature and position. Consequently, the position of the backlight source-based real image BL_re5 (i.e., the eyebox) is able to move with the eyes E. However, a movable backlight source 1 needs a greater space.

SUMMARY

Accordingly, the objective of the present invention is to provide a head-up display using backlight to control an eyebox, thereby preventing the image viewed by the viewer, from becoming incomplete or quality degradation due to the change of position of the eyes of the viewer.

The present invention, according to an exemplary embodiment, provides a head-up display using backlight to control an eyebox, applicable to being used with an imaging semi-reflective mirror, and including: a backlight source for projecting a backlight beam; a switchable adjustment mirror device including a plurality of mirrors of different curvatures, and each one of the plurality of mirrors configured to be selective to reflect the backlight beam from the backlight source; a backlight concave mirror arranged to reflect the backlight beam reflected by one of the plurality of mirrors; a display panel arranged to display an image and to allow the backlight beam reflected by the backlight concave mirror, to penetrate therethrough in order to form an image light beam; and an imaging concave mirror arranged to reflect the image light beam to the imaging semi-reflective mirror to form a display panel-based virtual image at one side of the imaging semi-reflective mirror away from a viewer and to form a backlight source-based real image at one side of the imaging semi-reflective mirror close to the viewer and positioned at eyes of the viewer, and the backlight source-based real image being the eyebox.

Optionally, the imaging semi-reflective mirror is a windshield or a combiner for partially reflecting the image light beam from the imaging concave mirror to the eyes of the viewer while allowing a portion of front scenery light to penetrate therethrough to reach the eyes of the viewer at the same time.

Optionally, the switchable adjustment mirror device further comprises a roller, the roller includes the plurality of mirrors arranged thereon, and the roller is configured to rotate in order to allow the backlight beam from the backlight source to be projected onto one of the plurality of mirrors.

Optionally, at least one end of a roller shaft of the roller is movable along a shaft curve.

Optionally, the switchable adjustment mirror device further comprises a turntable, the turntable includes the plurality of mirrors arranged thereon, and the turntable is configured to rotate in order to allow the backlight beam from the backlight source to be projected onto one of the plurality of mirrors.

Optionally, at least one end of a turntable shaft of the turntable is movable along a shaft curve.

Optionally, the plurality of mirrors includes at least one curved mirror, or at least one plane mirror, or includes at least one curved mirror and at least one plane mirror.

Optionally, the curved mirror is a spherical mirror, an aspherical mirror or a freeform mirror.

Optionally, an orientation of each one of the plurality of mirrors is adjustable in order to determine a position of the eyebox in a first axial direction and a second axial direction, the first axial direction is perpendicular to the second axial direction, and both the first axial direction and the second axial direction are perpendicular to a viewing direction of the viewer.

The head-up display of the present invention utilizes the switchable adjustment mirror device arranged on the light path between the backlight source and the display panel such that the position of the backlight source-based real image is able to change with the position of the eyes of the viewer. Accordingly, the objective of maintaining the integrity and excellent quality of the image viewed by the viewer can be achieved when the position of the eyes of the viewer changes.

BRIEF DESCRIPTION OF THE DRAWINGS

The features and advantages of the present invention will become apparent after reading the following detailed description along with the accompanied drawings:

FIGS. 15A and 15B are a cross sectional view and a schematic view of a roller type switchable adjustment mirror device according to an embodiment of the present invention respectively;

FIGS. 16A and 16B are a cross sectional view and a schematic view of a roller type switchable adjustment mirror device according to an embodiment of the present invention respectively;

FIGS. 17A and 17B are a cross sectional view and a schematic view of a roller type switchable adjustment mirror device according to an embodiment of the present invention respectively;

FIGS. 37A to 37D are schematic views showing the mirror of the turntable type switchable adjustment mirror device being controlled to rotate upward and downward in different methods;

FIG. 37E is a schematic view showing the change of rotation angle of the mirror selected when the two opposite ends of the turntable shaft of the turntable type switchable adjustment mirror device of FIG. 37D respectively moves along the two shaft curves;

DETAILED DESCRIPTION OF THE INVENTION

An imaging semi-reflective mirror of the present invention can be a windshield or a combiner, used for reflecting a portion of the projected image light to the eyes of a viewer while allowing a portion of front scenery light to penetrate therethrough to reach the eyes of the viewer at the same time. The following embodiments take the windshield as an example of the semi-reflective mirror for illustration; and however, the same effect can still be achieved even though the windshield is replaced by a combiner.

Figure 1A:
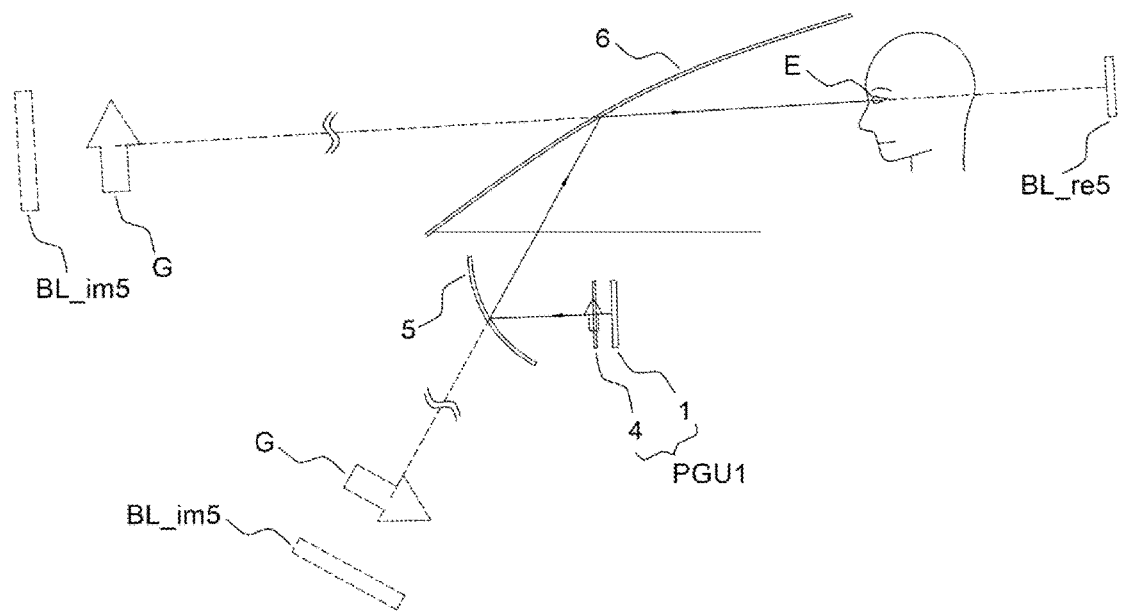
FIG. 1A is a schematic view showing the imaging of a currently existing head-up display and showing an eyebox.
Figure 1B:
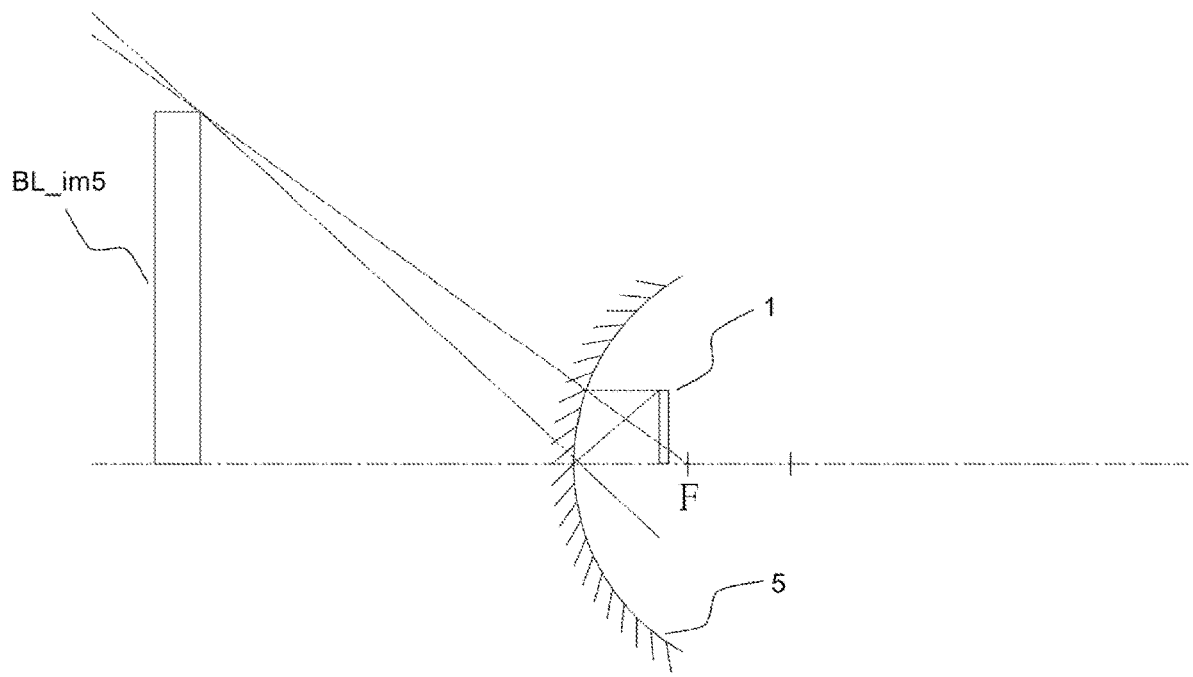
FIG. 1B is a schematic view showing the imaging of the head-up display of FIG. 1A when the backlight source is positioned within the focal length of the imaging concave mirror.
Figure 1C:
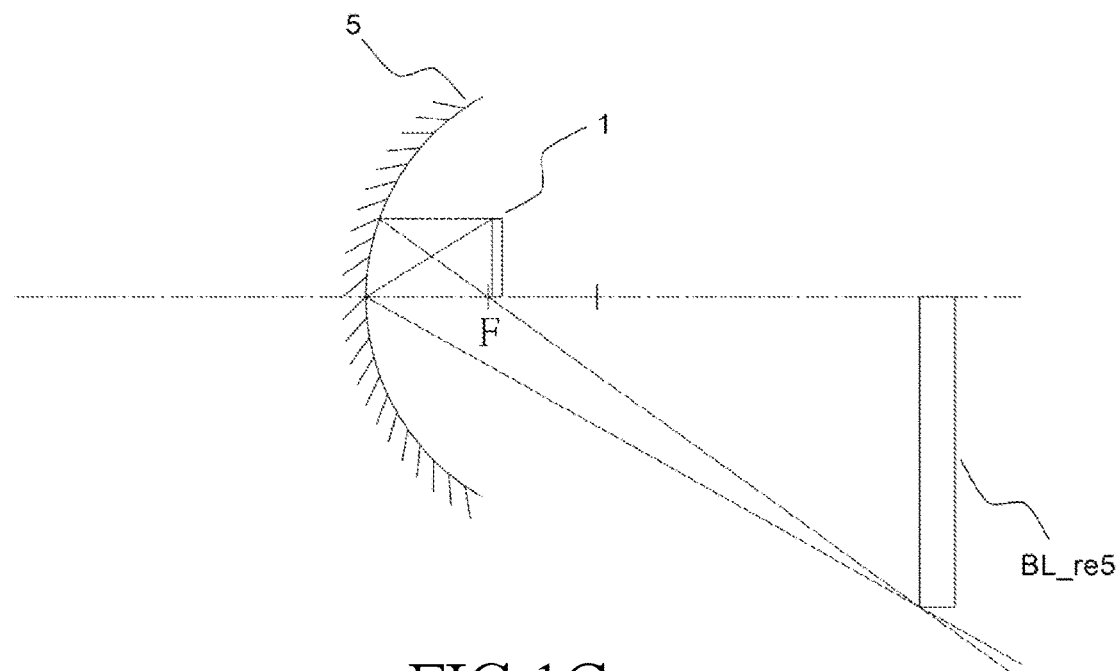
FIG. 1C is a schematic view showing the imaging of the head-up display of FIG. 1A when the backlight source is positioned outside the focal length of the imaging concave mirror.
Figure 2A:
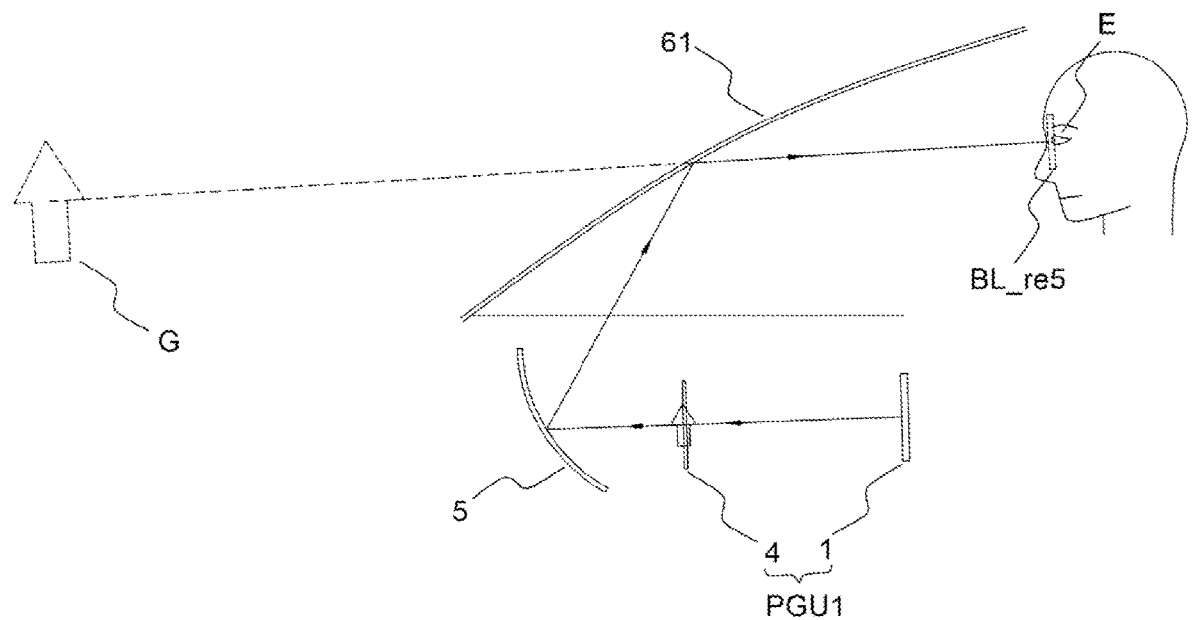
FIGS. 2A and 2B are schematic views showing the real image of the backlight source of a currently existing head-up display positioned at the eyes of the viewer.
Figure 2B:
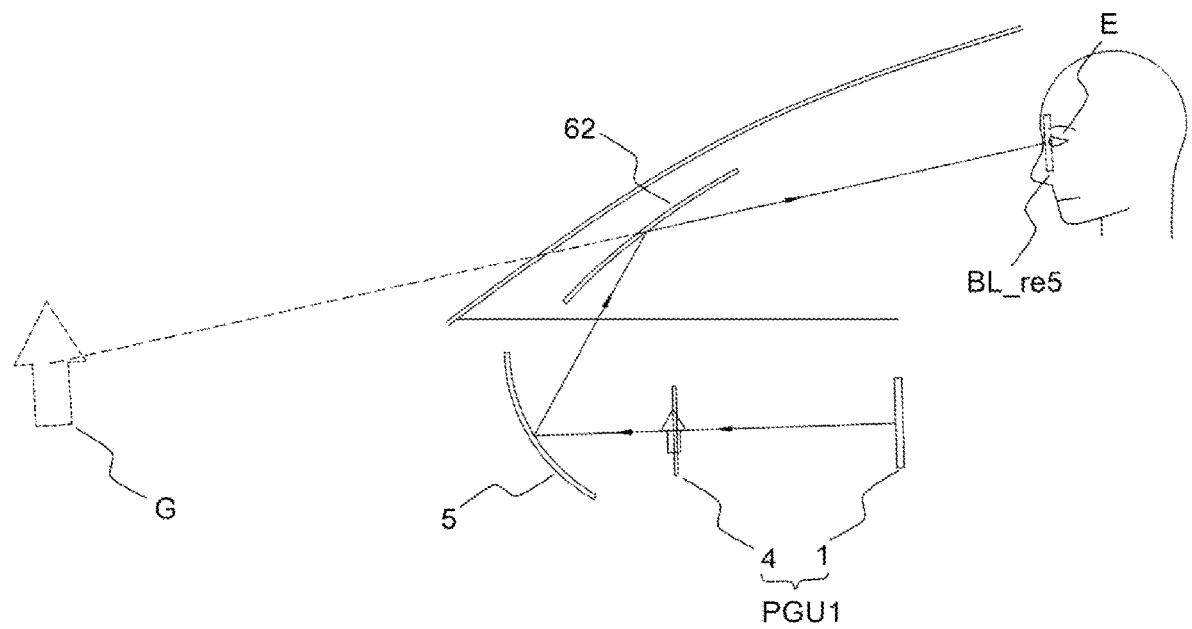
Figure 2C:
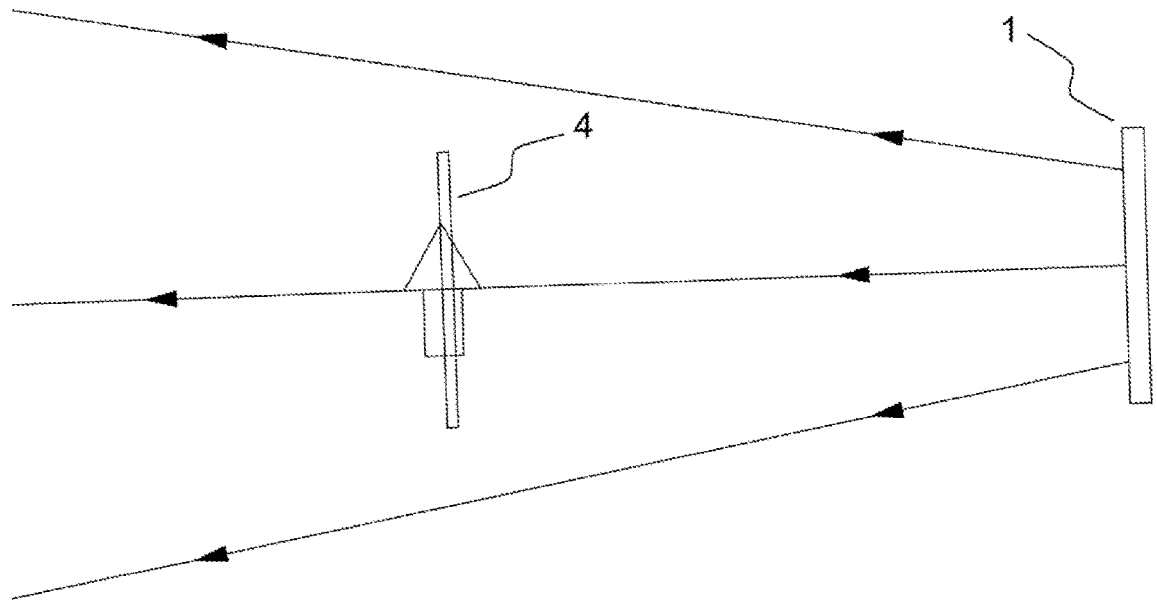
FIG. 2C is a schematic view showing the backlight source of the head-up display of FIGS. 2A and 2B projects a light beam onto the display panel.
Figure 3A:
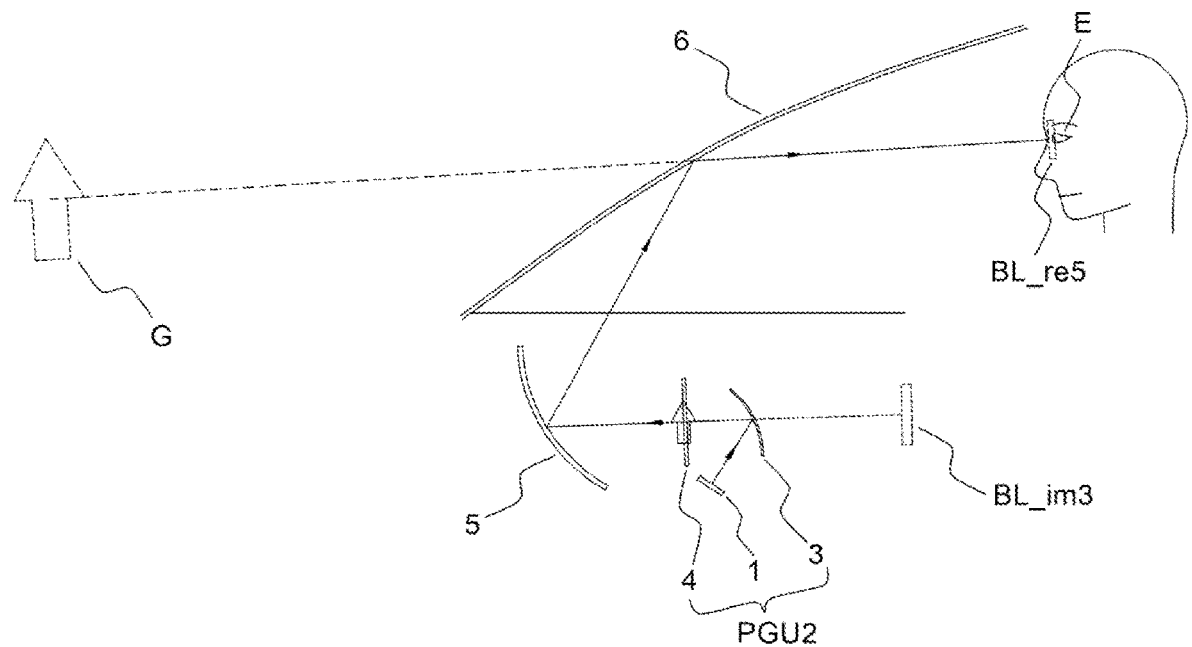
FIG. 3A is a schematic view showing the head-up display uses the backlight concave mirror for imaging, and showing an eyebox.
Figure 3B:
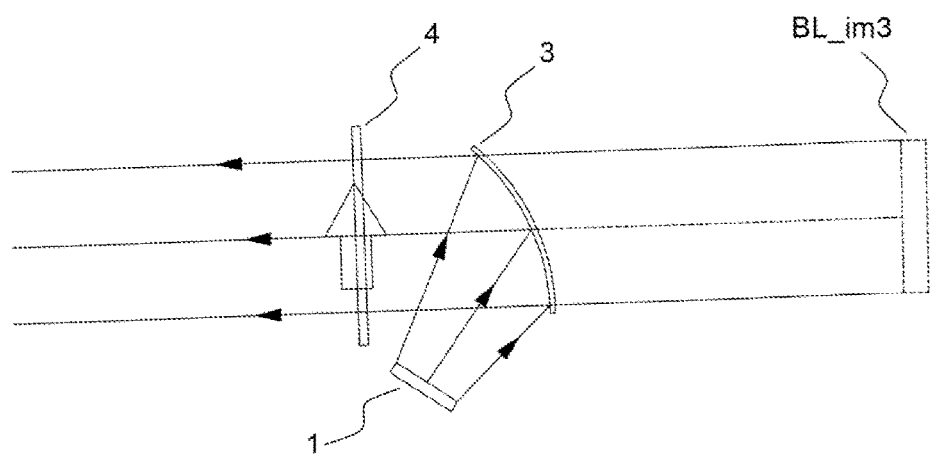
FIG. 3B is a schematic view showing the backlight source of the head-up display of FIG. 3A projects a light beam onto the display panel via the backlight concave mirror.
Figure 4:
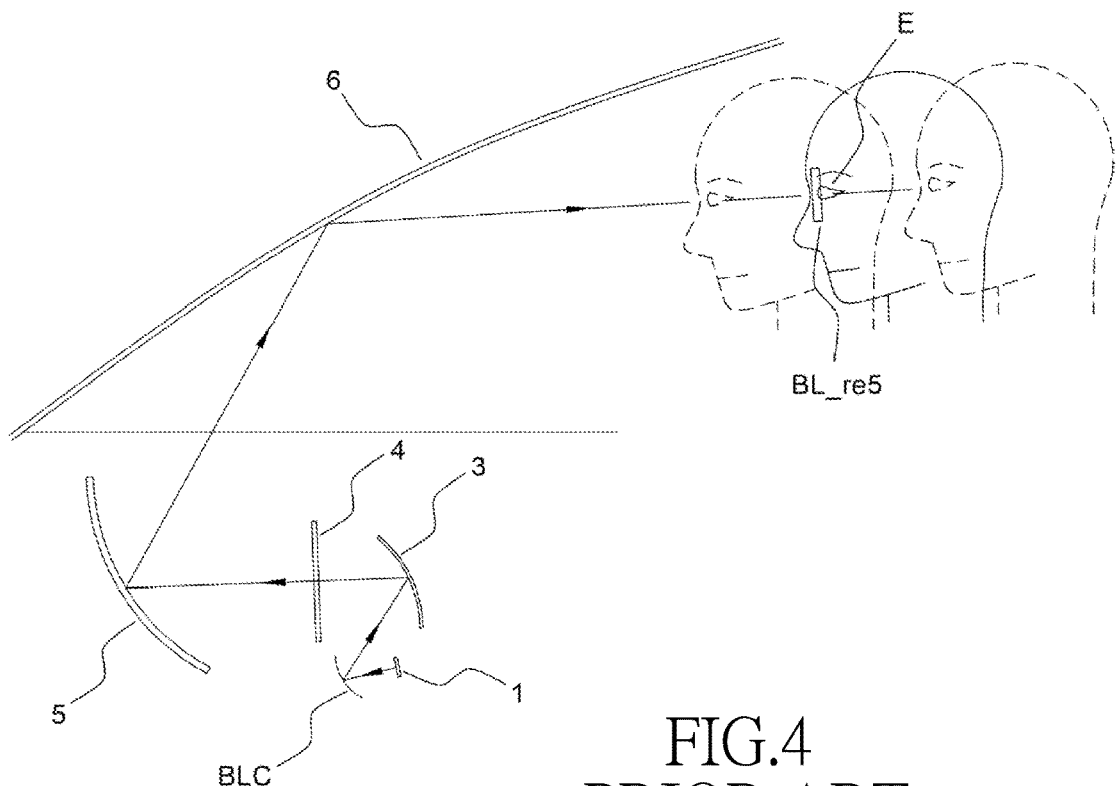
FIG. 4 is a schematic view of the head-up display during the movement of the eyes of the viewer.
Figure 5:
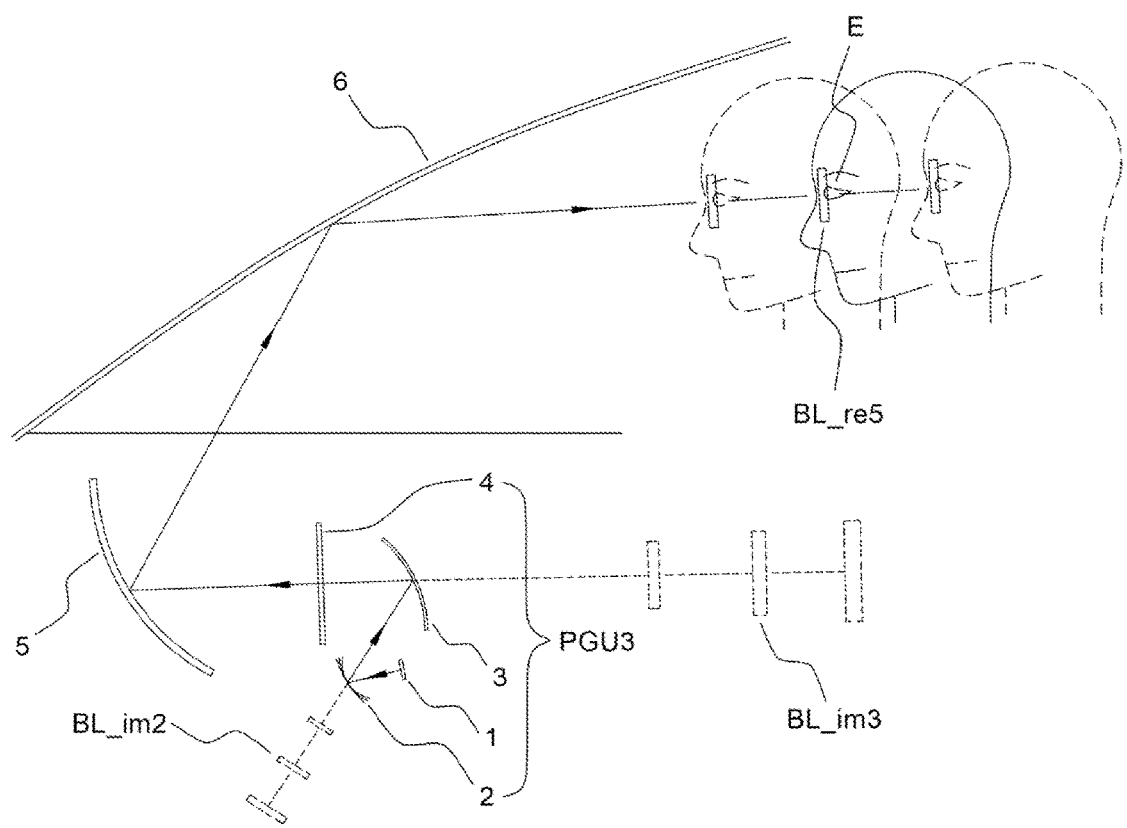
FIG. 5 is a schematic view showing the imaging of a head-up display with a split type switchable adjustment mirror device according to an embodiment of the present invention and showing an eyebox.

Please refer to FIG. 5, a head-up display according to an embodiment of the present invention, at least includes a picture generation unit PGU3, an imaging concave mirror 5 and a semi-reflective mirror 6.

The picture generation unit PGU3 includes a backlight source 1, a switchable adjustment mirror device 2, a backlight concave mirror 3 and a display panel 4. The backlight source 1 is able to project a backlight beam to the switchable adjustment mirror device 2. The switchable adjustment mirror device 2 includes a plurality of mirrors having different curvatures, and each one of the mirrors is configured to be selectively switched to reflect the backlight beam from the backlight source 1 to the backlight concave mirror 3. The backlight concave mirror 3 is arranged to reflect the backlight beam reflected by one of the mirrors, to the display panel 4. The display panel 4 is arranged to display an image and to allow the backlight beam reflected by the backlight concave mirror 3, to penetrate therethrough to form an image light beam.

The imaging concave mirror 5 is arranged to reflect the image light beam from the picture generation unit PGU3 to the imaging semi-reflective mirror 6 to form a display panel-based virtual image at one side of the imaging semi-reflective mirror 6 away from the viewer and to form a backlight source-based real image at an opposite side of the imaging semi-reflective mirror 6 close to the viewer and positioned at eyes E of the viewer. The backlight source-based real image is the eyebox.

The head-up display of the present invention allows the light from the backlight source 1 to form a backlight source-based adjustment virtual image BL_im2 of a different image distance and a different size through the switchable adjustment mirror device 2, by switching the mirrors of different curvatures of the switchable adjustment mirror device 2. Then, the backlight source-based adjustment virtual image BL_ime2 forms a backlight source-based virtual image BL_im3 at a different distance from the rear of the backlight concave mirror 3 correspondingly. Finally, the backlight source-based virtual image BL_im3 at a different distance from the rear of the backlight concave mirror 3 forms a backlight source-based real images BL_re5 (i.e., the eyebox) at a different distance from the front of the imaging concave mirror 5, and the backlight source-based real images BL_re5 at a different distance from the front of the imaging concave mirror 5 corresponds to the eyes E of the viewer at a different distance from the imaging semi-reflective mirror 6. Accordingly, the problem of requiring a relatively larger space for the horizontal movement of the backlight source 1 may be resolved.

Figure 6:
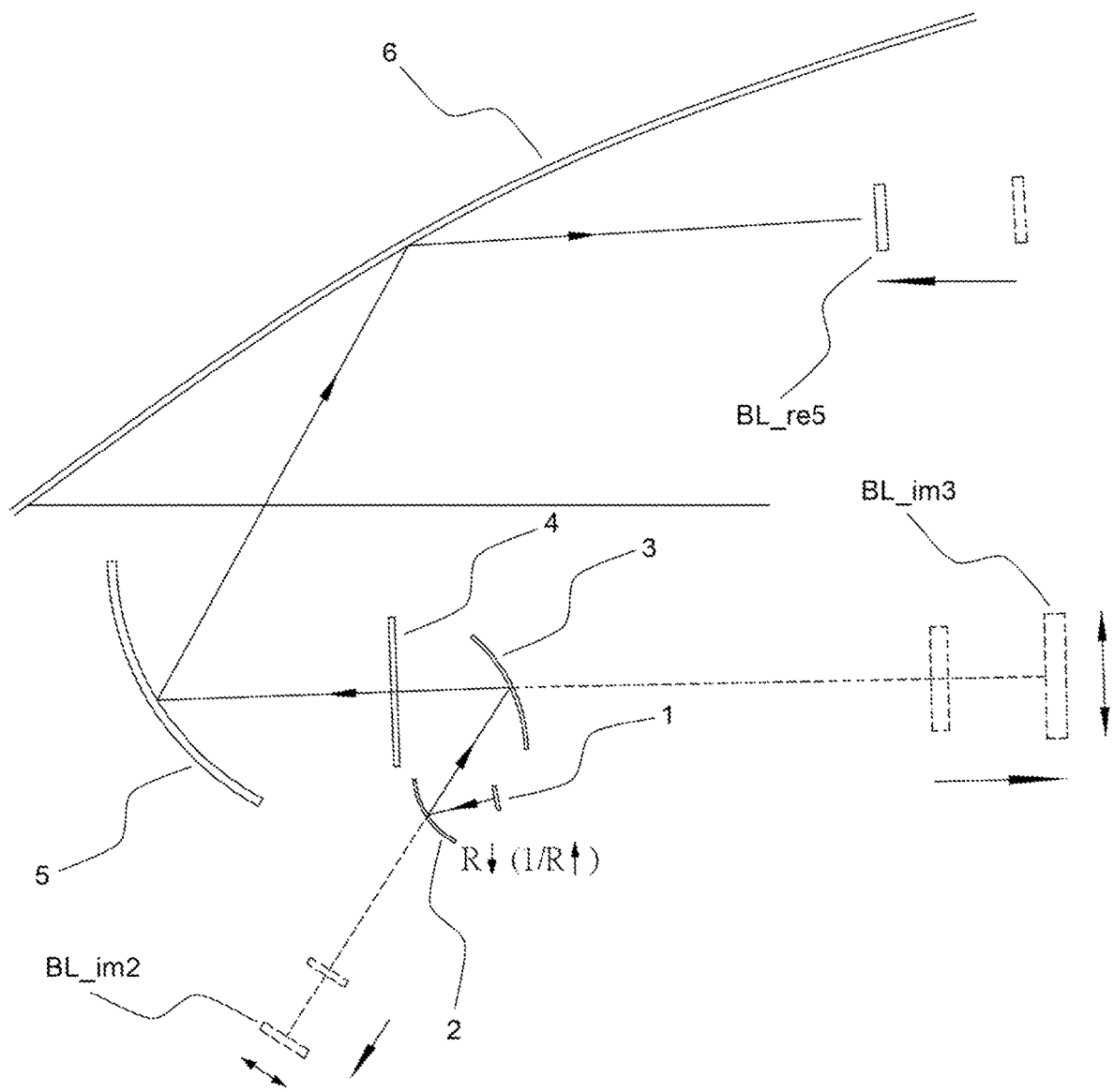
FIG. 6 is a schematic view showing the head-up display of FIG. 5 controlling the eyebox to move forward.
Figure 7:
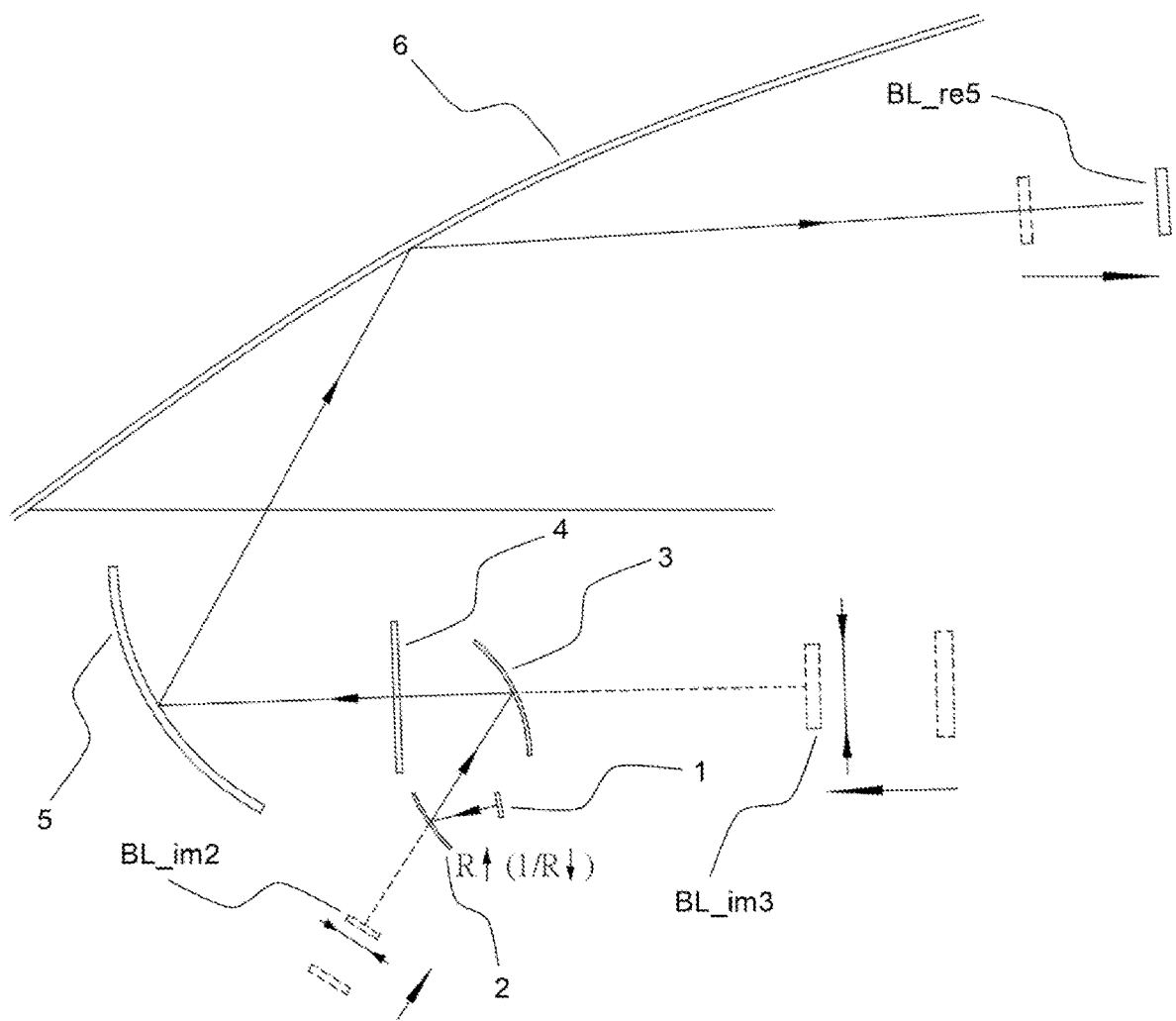
FIG. 7 is a schematic view showing the head-up display of FIG. 5 controlling the eyebox to move backward.

Please refer to FIGS. 6 to 7 for exemplarily explaining the switchable adjustment mirror device 2 of FIG. 5 in details.

In the example show in FIG. 6, when the eye tracking system (not shown in the figure) detects that the eyes of the viewer move forward, a concave mirror having a relatively smaller radius of curvature (R↓), i.e., a relatively larger curvature (1/R↑), among the mirrors of the switchable adjustment mirror device is selected. Since the backlight source 1 is still within the focal length of the switchable adjustment mirror device 2, the magnification power of the switchable adjustment mirror device 2 increases, such that the light path distance of the backlight source-based adjustment virtual image BL_im2 formed behind the switchable adjustment mirror device 2 increases, and the imaging magnification power of the backlight source-based adjustment virtual image BL_im2 also increases. Consequently, the light path distance between the backlight source-based adjustment virtual image BL_im2 and the backlight concave mirror 3 also increases but is not longer than the focal length of the backlight concave mirror 3. At this time, the light path distance of the backlight source-based virtual image BL_im3 formed behind the backlight concave mirror 3 increases, and the imaging magnification power of the backlight source-based virtual image BL_im3 also increases, such that the light path distance between the backlight source-based virtual image BL_im3 and the imaging concave mirror 5 that is longer than the focal length of the imaging concave mirror 5, increases, and the backlight source-based virtual image BL_im3 is at a longer distance from the focal point of the imaging concave mirror 5. Accordingly, the light path distance of the backlight source-based real image BL_re5 formed in front of the imaging concave mirror 5 is reduced, and imaging magnification power of the backlight source-based real image BL_re5 is also reduced, such that the backlight source-based real image BL_re5 (i.e., the eyebox) moves toward the imaging semi-reflective mirror 6, that is, moves forward with the eyes of the viewer, thereby maintaining the eyebox to overlap with the eyes of the viewer.

The backlight source-based real image BL_re5 experiences the increase of the magnification power of the switchable adjustment mirror device 2, the increase of magnification power of the backlight concave mirror 3 and the decrease of the magnification of the imaging concave mirror 5, and therefore, as long as the curvature is appropriate, the size of the final backlight source-based real image BL_re5 can be controlled and maintained to be similar to the sizes of the eyebox before and after the change of the curvature of the mirror of the switchable adjustment mirror device 2.

In the example show in FIG. 7, when the eye tracking system (not shown in the figure) detects that the eyes of the viewer move backward, the mirror selected in the switchable adjustment mirror device is a concave mirror having a relatively larger radius of curvature (R↓), i.e., a relatively smaller curvature (1/R↑), among the mirrors of the switchable adjustment mirror device is selected. Since the backlight source 1 is still within the focal length of the switchable adjustment mirror device 2, the magnification power of the switchable adjustment mirror device 2 decreases, such that the light path distance of the backlight source-based adjustment virtual image BL_im2 formed behind the switchable adjustment mirror device 2 decreases, and the imaging magnification power of the backlight source-based adjustment virtual image BL_im2 also decreases. Consequently, the light path distance between the backlight source-based adjustment virtual image BL_im2 and the backlight concave mirror 3 also decreases. At this time, the light path distance of the backlight source-based virtual image BL_im3 behind the backlight concave mirror 3 decreases, and the imaging magnification power of the backlight source-based virtual image BL_im3 also decreases, such that the light path distance between the backlight source-based virtual image BL_im3 and the imaging concave mirror 5, which is longer than the focal length of the imaging concave mirror 5, decreases but is not less than the focal length of the imaging concave mirror 5. Accordingly, the light path distance of the backlight source-based real image BL_re5 formed in front of the imaging concave mirror 5 increases, and the imaging magnification power of the backlight source-based real image BL_re5 also increases. In this way, the backlight source-based real image BL_re5 (i.e., the eyebox) moves along the direction away from the imaging semi-reflective mirror 6, that is, moves backward with the eyes of the viewer, thereby maintaining the eyebox to overlap with the eyes of the viewer.

The backlight source-based real image BL_re5 experiences the decrease of the magnification power of the switchable adjustment mirror device 2, the decrease of magnification power of the backlight concave mirror 3 and the increase of the magnification of the imaging concave mirror 5; and therefore, as long as the curvature is appropriate, the size of the final backlight source-based real image BL_re5 can be controlled and maintained to be similar to the sizes of the eyebox before and after the change of curvature of the mirror of the switchable adjustment mirror device 2.

The plurality of mirrors having different curvatures in the switchable adjustment mirror device 2 as shown in FIG. 5 can be achieved by using a plurality of separate elements, and a switching mechanism of the switchable adjustment mirror device 2 can be used to adaptively select an element of an appropriate curvature; and however, the present invention is not limited to such a configuration. In another embodiment, the plurality of mirrors having different curvatures in the switchable adjustment mirror device 2 can be integrated into one piece, and thus, the curvature of the switchable adjustment mirror device 2 can be changed swiftly and the space required can also be saved.

Figure 8:
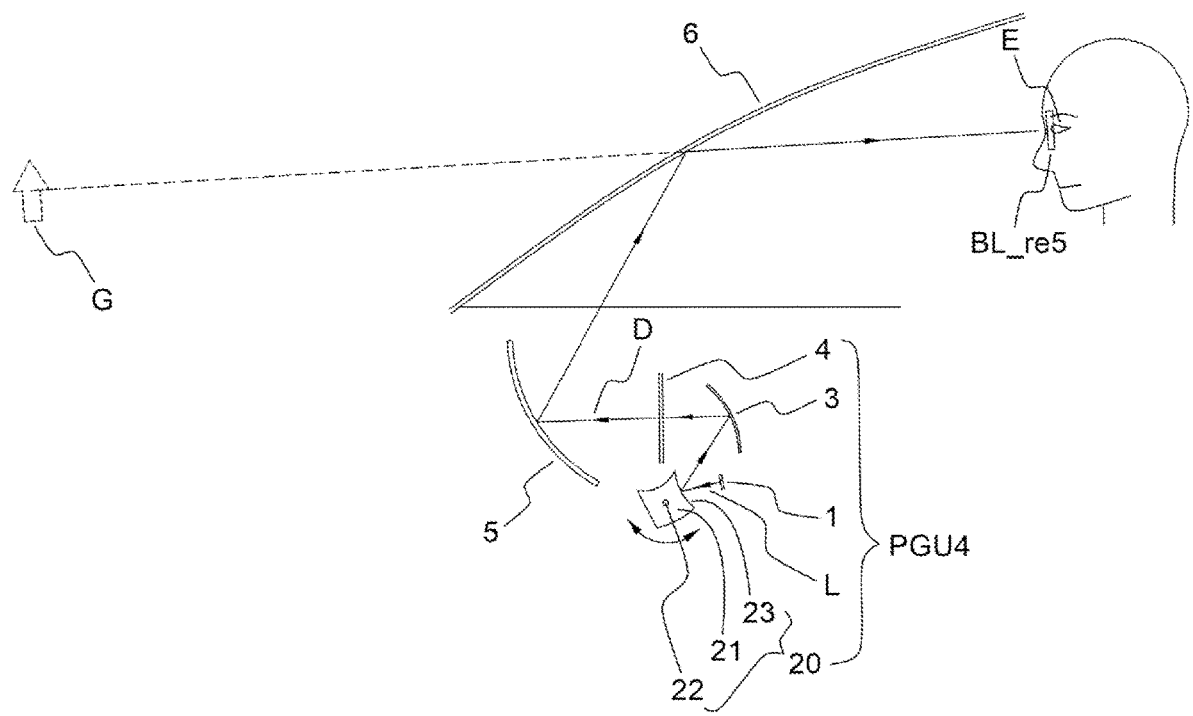
FIG. 8 is a schematic view showing the imaging of a head-up display with a roller type switchable adjustment mirror device according to an embodiment of the present invention and showing an eyebox.
Figure 9A:
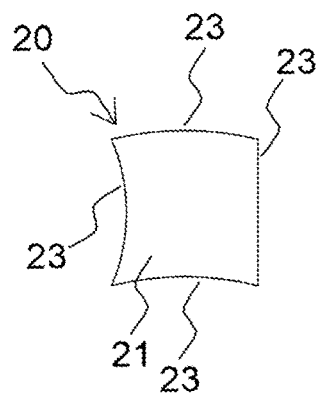
FIGS. 9A and 9B are a cross sectional view and a schematic view of a roller type switchable adjustment mirror device according to an embodiment of the present invention respectively.
Figure 9B:
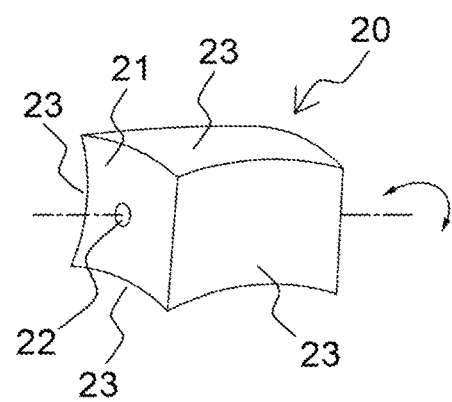

As shown in FIGS. 8 to 9B, the switchable adjustment mirror of the picture generation unit PGU4 of the head-up display is a roller type switchable adjustment mirror device 20, which is an integrated switchable adjustment mirror device and includes a roller 21, a roller shaft 22 of the roller 21 and a roller driver rotatably connected to the roller shaft 22. The roller 21 includes four mirrors 23 of different curvatures. The head-up display is able to drive the roller 21 to rotate via the roller driver in order to switch the mirrors 23 of different curvatures, so that the backlight beam L from the backlight source 1 can be projected onto the mirror 23 selected and then be reflected to the backlight concave mirror 3.

The backlight concave mirror 3 then reflects the backlight beam L from the mirror 23 to the display panel 4. After the backlight beam L penetrates through the display panel 4, it becomes an image light beam D to reach the imaging concave mirror 5. The image light beam D is reflected by the imaging concave mirror 5 to the imaging semi-reflective mirror 6, and then the image light beam D is reflected by the imaging semi-reflective mirror 6 to the eyes E of the viewer in order to form a display panel-based virtual image G at one side of the imaging semi-reflective mirror 6 away from the viewer and to form a backlight source-based real image BL_re5 at one side of the imaging semi-reflective mirror 6 close to the viewer.

In such a head-up display, the equivalent distance of the backlight source 1 changes as the backlight beam L is reflected by a different mirrors 23 of a different curvature. Therefore, the equivalent distance of the backlight source 1 can be changed to control the position of the backlight source-based real image BL_re5, that is, control the horizontal position of the eyebox.

Figure 10A:
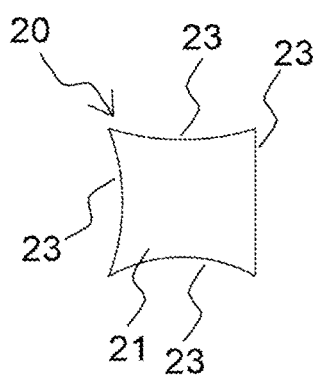
FIGS. 10A and 10B are a cross sectional view and a schematic view of a roller type switchable adjustment mirror device according to an embodiment of the present invention respectively.
Figure 10B:
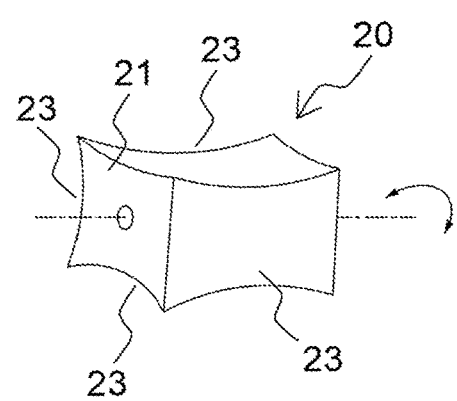
Figure 11A:
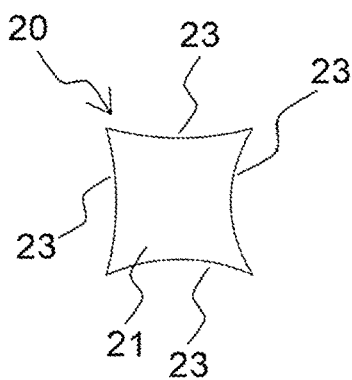
FIGS. 11A and 11B are a cross sectional view and a schematic view of a roller type switchable adjustment mirror device according to an embodiment of the present invention respectively.
Figure 11B:
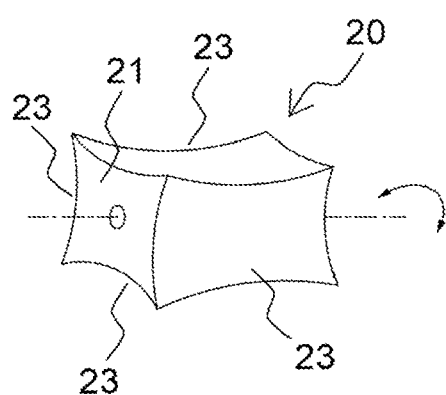
Figure 12A:
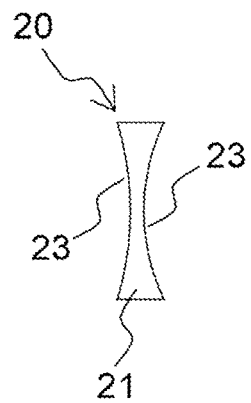
FIGS. 12A and 12B are a cross sectional view and a schematic view of a roller type switchable adjustment mirror device according to an embodiment of the present invention respectively.
Figure 12B:
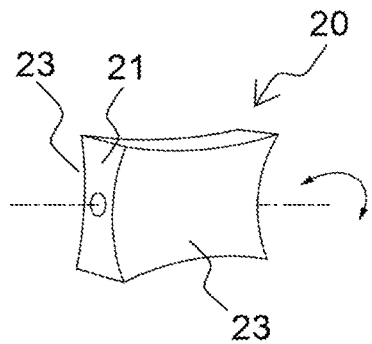
Figure 13A:
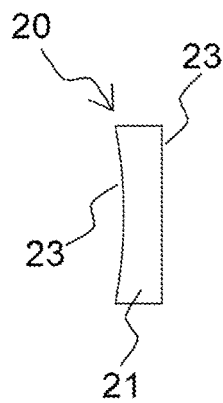
FIGS. 13A and 13B are a cross sectional view and a schematic view of a roller type switchable adjustment mirror device according to an embodiment of the present invention respectively.
Figure 13B:
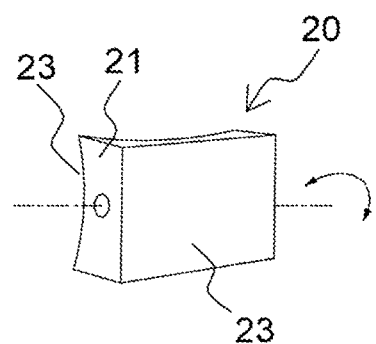
Figure 14A:
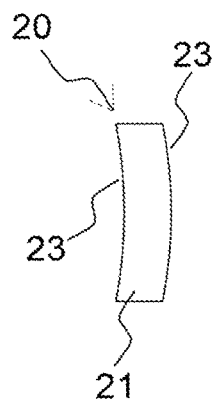
FIGS. 14A and 14B are a cross sectional view and a schematic view of a roller type switchable adjustment mirror device according to an embodiment of the present invention respectively.
Figure 14B:
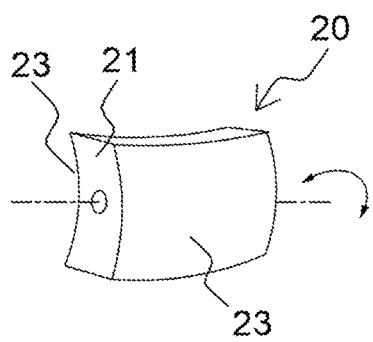

As shown in FIGS. 8 to 9B, in the roller type switchable adjustment mirror device 20, the four mirrors 23 include one plane mirror, one convex mirror, and two concave mirrors. However, the present invention is not limited to such a configuration. In another embodiment, for the four mirrors 23 on the roller 21 of the roller type switchable adjustment mirror device 20, the quantities of plane mirrors, convex mirrors and concave mirrors can have other arrangement combination, such as one plane mirror and three convex mirrors as shown in FIGS. 10A and 10B, or four convex mirrors as shown in FIGS. 11A and 11B. Alternatively, in another embodiment, the quantity of mirrors 23 on the roller 21 of the roller type switchable adjustment mirror device 20 can be modified to two mirrors as shown in FIGS. 12A to 14B, modified to three mirrors as shown in FIGS. 15A to 17B, or modified to more than four mirrors; and the respective mirror 23 can be a plane mirror, a convex mirror or a concave mirror. When a convex mirror is used, the backlight source 1 is able to form a virtual image of a reduced size within the focal length at the rear of the convex mirror. When a plane mirror is used, the light from the backlight source 1 is able to form a virtual image of an identical size at the same distance as the distance between the plane mirror and the backlight source 1, from the rear of the plane mirror. Accordingly, in addition to the concave mirror, both the convex mirror and plane mirror can also be used to change the light path distance and size of the backlight source-based adjustment virtual image, in order to change the light path distance and size of the eyebox.

Figure 18A:
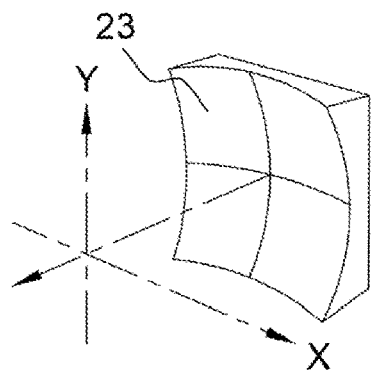
FIGS. 18A to 18E are schematic views showing one of the mirrors of the switchable adjustment mirror device according to different embodiments of the present invention respectively.
Figure 18B:
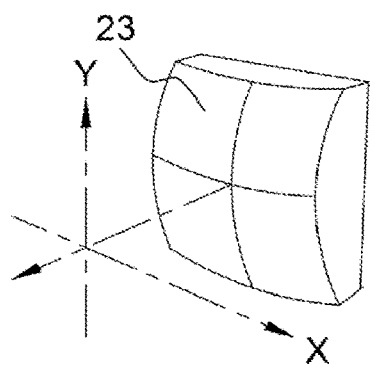
Figure 18C:
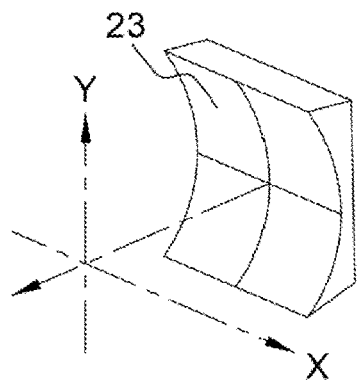
Figure 18D:
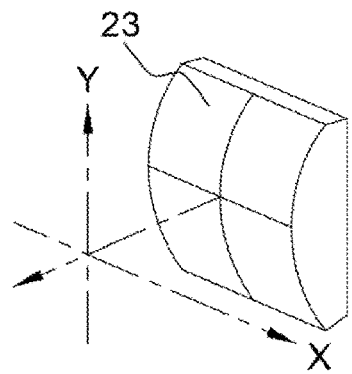
Figure 18E:
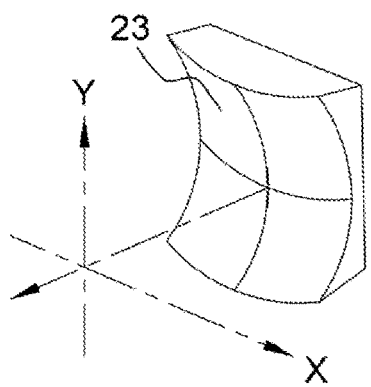

The respective mirror 23 of the roller type switchable adjustment mirror 20 can be a spherical mirror, an aspherical mirror or a freeform mirror. The curved surface type of mirror can be, such as a toroidal mirror, an elliptical mirror, an off-axis ellipsoidal mirror, a parabolical mirror, an off-axis parabolical mirror or a hyperbolic paraboloid mirror, having different curvatures in the X-axis and Y-axis. The curved surface shape of mirror can belong to, for example, a double concave curved mirror as shown in FIG. 18A, a double convex curved mirror as shown in FIG. 18B, a column concave mirror as shown in FIG. 18C, a column convex mirror as shown in FIG. 18D, or a saddle mirror as shown in FIG. 18E.

Figure 19:
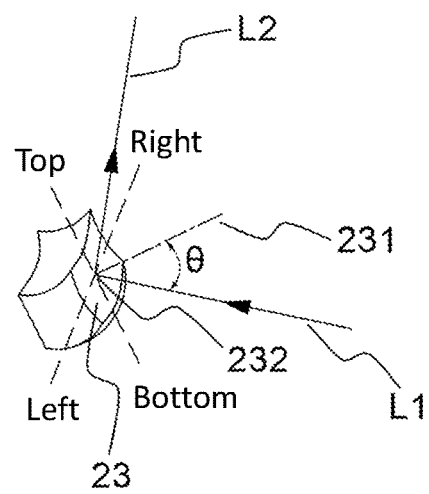
FIG. 19 is a schematic view showing different orientations of the mirror of the roller type switchable adjustment mirror device according to an embodiment of the present invention.

The roller type switchable adjustment mirror device 20 of the head-up display shown in FIG. 8 is used to exemplarily describe the operation scenarios of the head-up display of the present invention. To clearly define the rotating direction of the mirror 23, please refer to FIG. 19, the incident backlight light beam L1 is projected to the lens 23 and is reflected by the lens 23 to be emitted out as the output backlight light beam L2, and the angle θ between the incident backlight light beam L1 and the normal 231 of the lens center 232 is not zero degree. Under such a condition, the parallel component of the source direction of the incident backlight beam L1 is defined as the bottom, the parallel component of the emission direction of the output backlight beam L2 is defined as the top, the right hand side facing the mirror 23 is defined as the right side, the left hand side facing the mirror 23 is defined as the left side, the upward rotation of the mirror 23 means that the mirror 23 rotates toward the top, the downward rotation of the mirror 23 means that the mirror 23 rotates toward the bottom, the rightward rotation of the mirror 23 means that the mirror 23 rotates to the right side, and the leftward rotation of the mirror 23 means that the mirror 23 rotates to the left side.

<The Position of the Eyebox can be Adjusted Forward and Backward>

Figure 20:
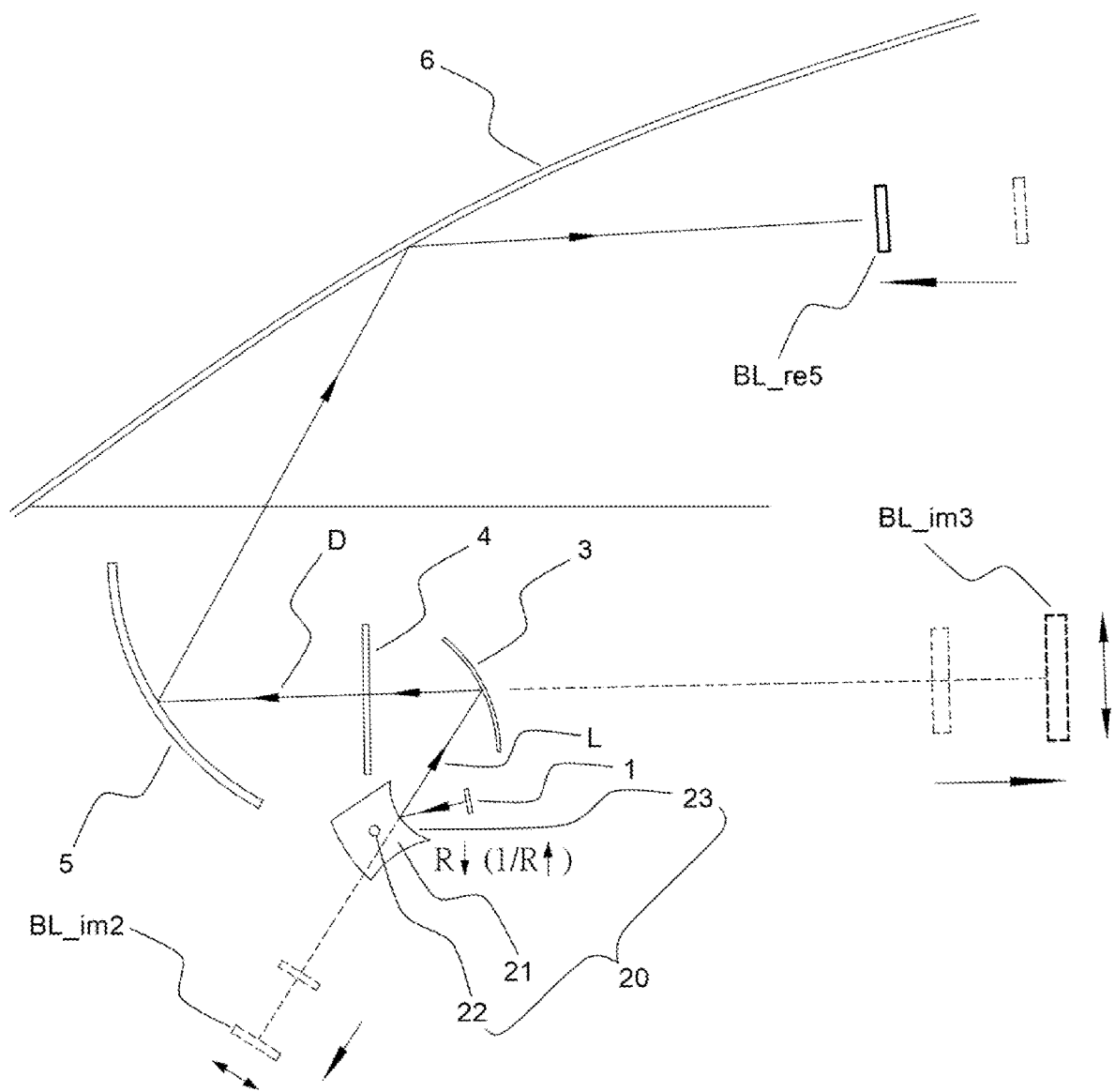
FIG. 20 is a schematic view showing the head-up display of FIG. 8 controlling the eyebox to move forward.

As shown in FIG. 20, if the eye tracking system (not shown in the figure) detects that the eyes of the viewer move toward the front, the roller 21 of the roller type switchable adjustment mirror device 20 can be rotated, switch to a mirror 23 having a larger curvature (1/R↑), i.e., a smaller radius of curvature (R↓), so that the image distance of the backlight source-based adjustment virtual image BL_im2 increases to increase the image distance of the backlight source-based virtual image BL_im3, and finally, reduce the image distance of the backlight source-based real image BL_re5. As a result, the eyebox is able to move forward with the eyes of the viewer. Moreover, when the curvature of the mirror 23 is appropriate, the size of the eyebox can be kept approximately unchanged.

Figure 21:
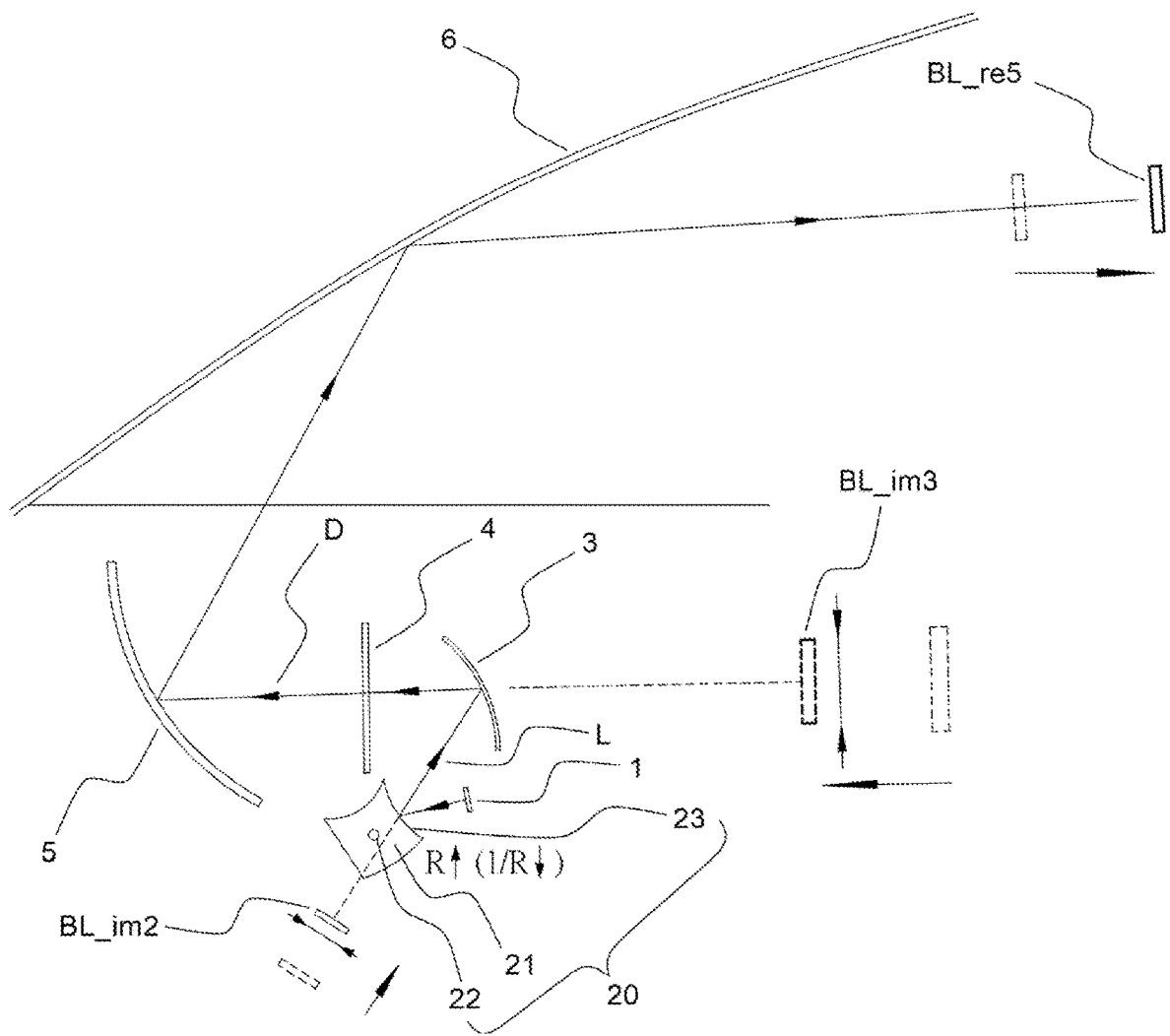
FIG. 21 is a schematic view showing the head-up display of FIG. 8 controlling the eyebox to move backward.

On the contrary, as shown in FIG. 21, if the eye tracking system (not shown in the figure) detects that the eyes of the viewer move toward the rear, the roller 21 of the roller type switchable adjustment mirror device 20 can be rotated, switch to a mirror 23 having a smaller curvature (1/R↑), i.e., a larger radius of curvature (R↓), so that the image distance of the backlight source-based adjustment virtual image BL_im2 decreases to decrease the image distance of the backlight source-based virtual image BL_im3, and finally, increase the image distance of the backlight source-based real image BL_re5. As a result, the eyebox is able to move rearward with the eyes of the viewer. Moreover, when the curvature of the mirror 23 is appropriate, the size of the eyebox can be kept approximately unchanged.

<The Position of the Eyebox can be Adjusted Upward and Downward>

When the vertical height of the eyes of the viewer changes, that is, the position of the eyes of the viewer changes in the first axial direction perpendicular to the viewing direction, the roller 21 can still be rotated to rotate the mirror 23 upward and downward in order to adjust the vertical height of the eyebox.

Figure 22:
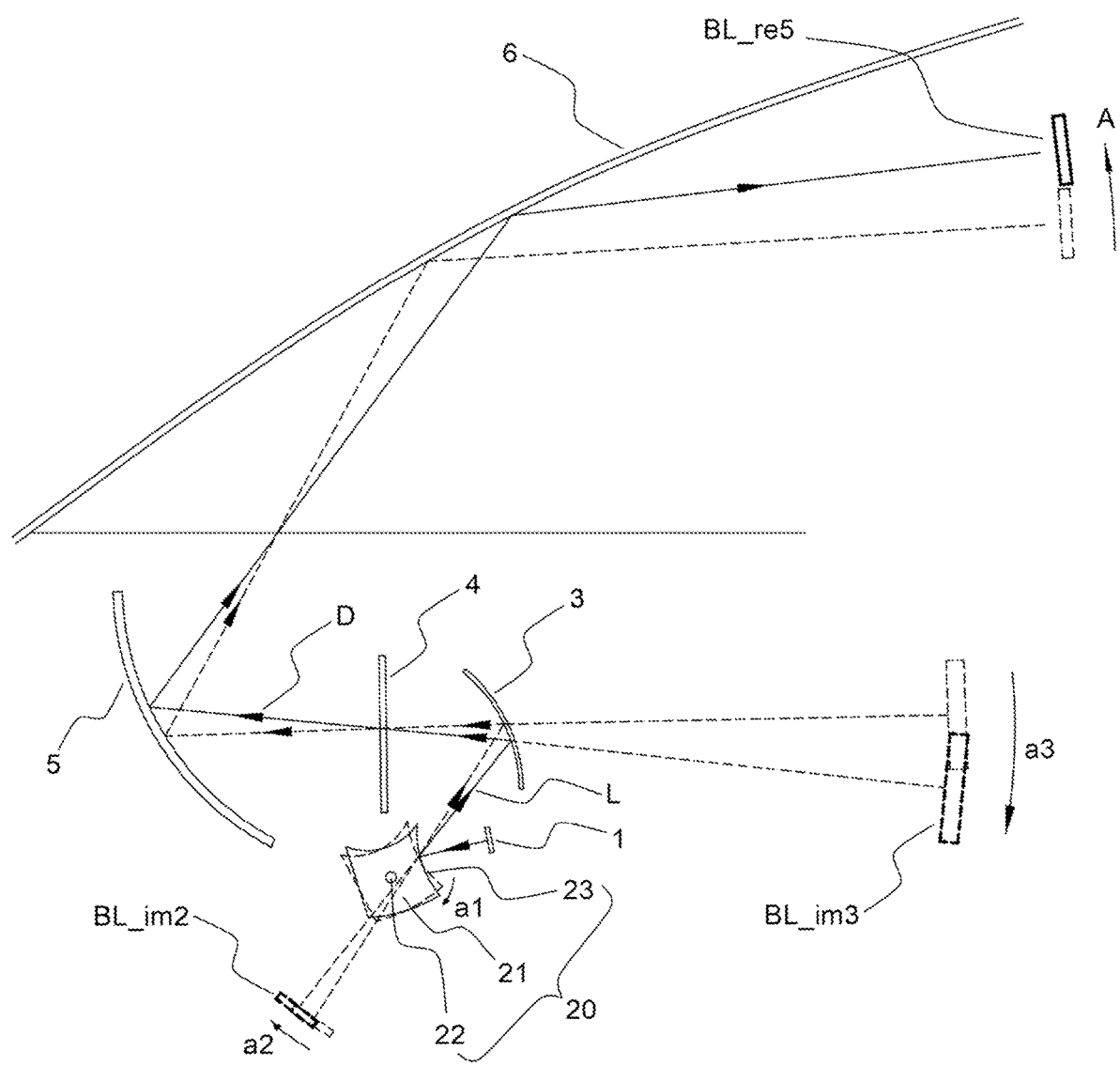
FIG. 22 is a schematic view showing the head-up display of FIG. 8 controlling the eyebox to move upward.

As shown in FIG. 22, if the eye tracking system (not shown in the figure) detects that the eyes of the viewer move upward, the roller 21 can be driven to rotate clockwise about the roller shaft 22 in view of the figure, so that the mirror 23 currently used rotates downward by an angle a1. At this time, the backlight source-based adjustment virtual image BL_im2 correspondingly rotates clockwise by an angle a2, and the backlight source-based virtual image BL_im3 also rotates clockwise by an angle a3, such that the backlight source-based real image BL_re5 rotates counterclockwise by an angle A. Accordingly, under the condition where the light path does not exceed the effective range of each element, the eyebox can be moved toward the top with the eyes of the viewer.

Figure 23:
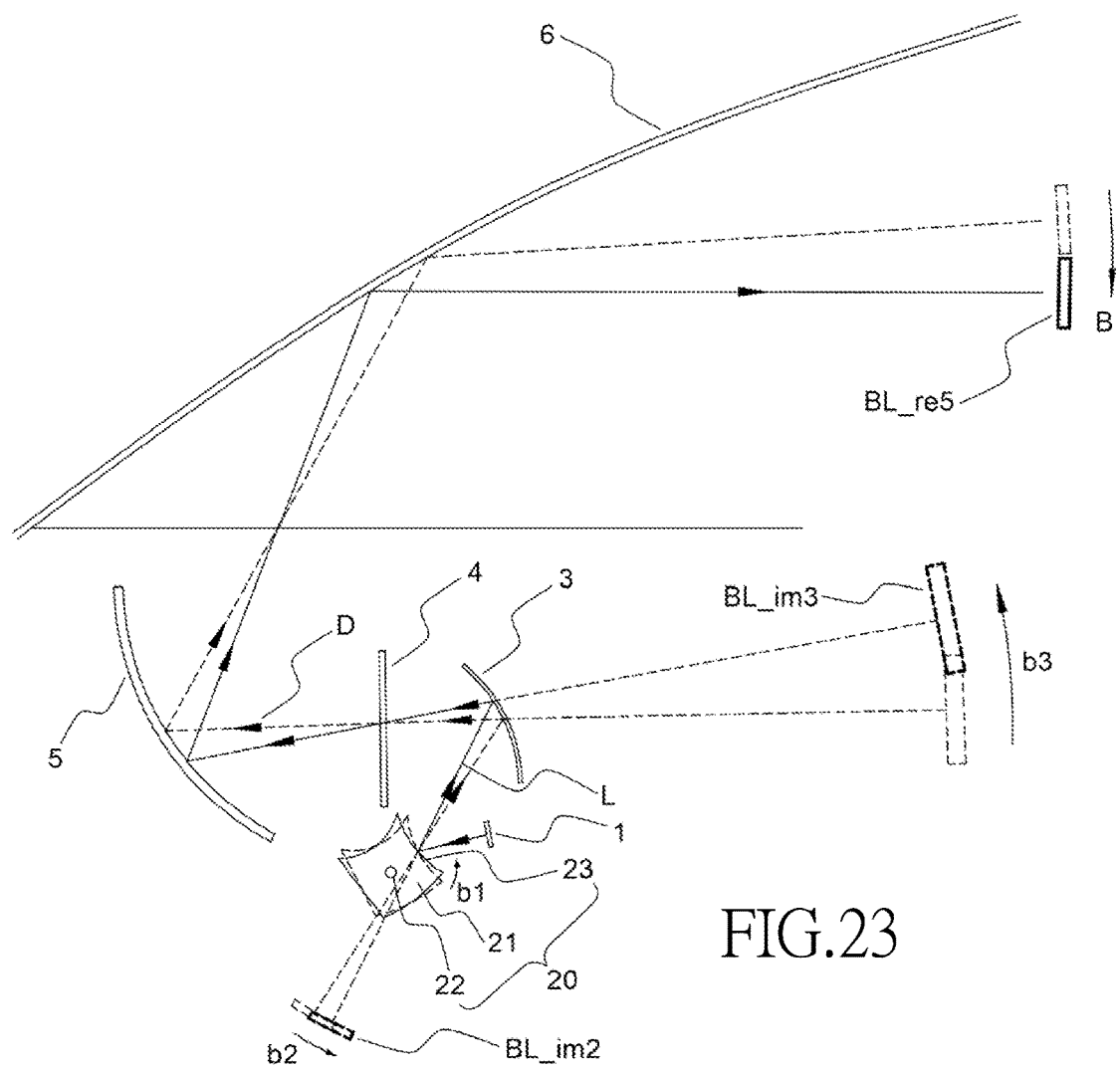
FIG. 23 is a schematic view showing the head-up display of FIG. 8 controlling the eyebox to move downward.

On the contrary, as shown in FIG. 23, if the eye tracking system (not shown in the figure) detects that the eyes of the viewer move downward, the roller 21 can be driven to rotate counterclockwise about the roller shaft 22 in view of the figure, so that the mirror 23 currently used rotates upward by an angle b1. At this time, the backlight source-based adjustment virtual image BL_im2 correspondingly rotates counterclockwise by an angle b2, and the backlight source-based virtual image BL_im3 also rotates counterclockwise by an angle b3, such that the backlight source-based real image BL_re5 rotates clockwise by an angle B. Accordingly, under the condition where the light path does not exceed the effective acting range of each element, the eyebox can be moved toward the bottom with the eyes of the viewer.

The upward and downward rotating directions of the mirror 23 and the upward and downward moving directions of the eyebox are not limited to be the same. In fact, the rotating direction of the mirror 23 and the moving direction of the eyebox can be different from each other as long as they have a linkage relationship therebetween. In addition, the values of the angles A and B can be calculated from the rotating angle of the roller, the curvature of each curved mirror and the curvature of the imaging semi-reflective mirror, or can also be obtained via simulation or actual measurement.

Figures 24A, 24B:
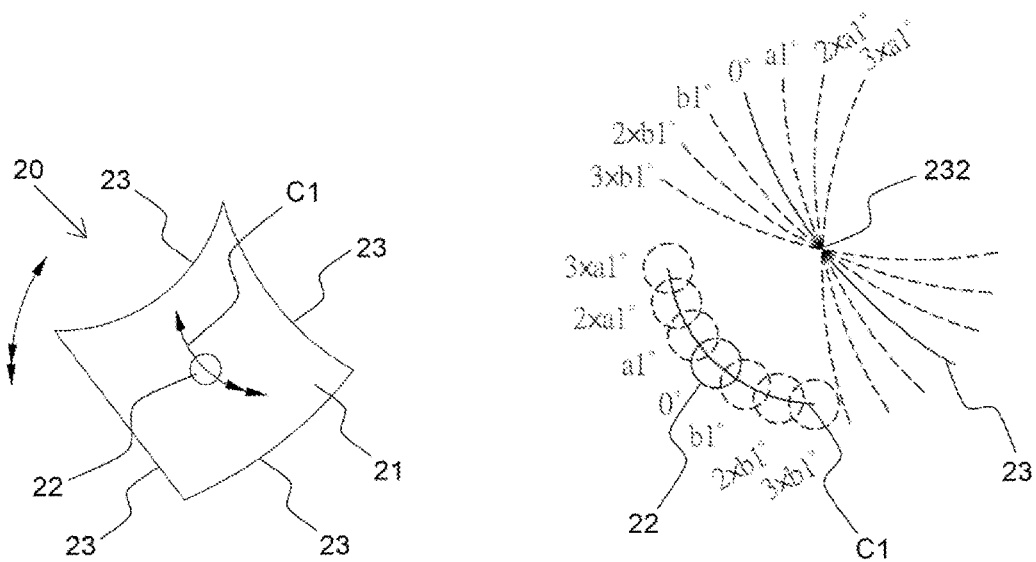
FIG. 24A is a schematic view showing the roller shaft of the roller type switchable adjustment mirror device of FIGS. 9A and 9B moving along the shaft curve according to an embodiment of the present invention.
FIG. 24B is a schematic view showing the change of rotation angle of the mirror selected when the roller shaft of the roller type switchable adjustment mirror device of FIG. 24A moves along the shaft curve.

Optionally, as shown in FIGS. 24A and 24B, when the roller 21 of the roller type switchable adjustment mirror device 20 rotates to rotate the mirror 23 upward and downward in order to adjust the vertical height of the eyebox, the roller shaft 22 can move along a shaft curve C1 while rotating, such that the rotating axle center of the mirror 23 during the upward and downward rotation of the mirror 23 is fixed at the mirror center 232 of the mirror 23, and the setting of the light path after reflection is not affected due to the change of angle.

<The Position of the Eyebox can be Adjusted Leftward and Rightward>

Similar to the adjustment of the vertical height of the eyebox, the mirror 23 of the roller type switchable adjustment mirror device 20 can also be rotated leftward and rightward in order to adjust the position of the eyebox to the right and left sides, i.e., change the position of the eyebox in the second axial direction perpendicular to the viewing direction.

Figure 25:
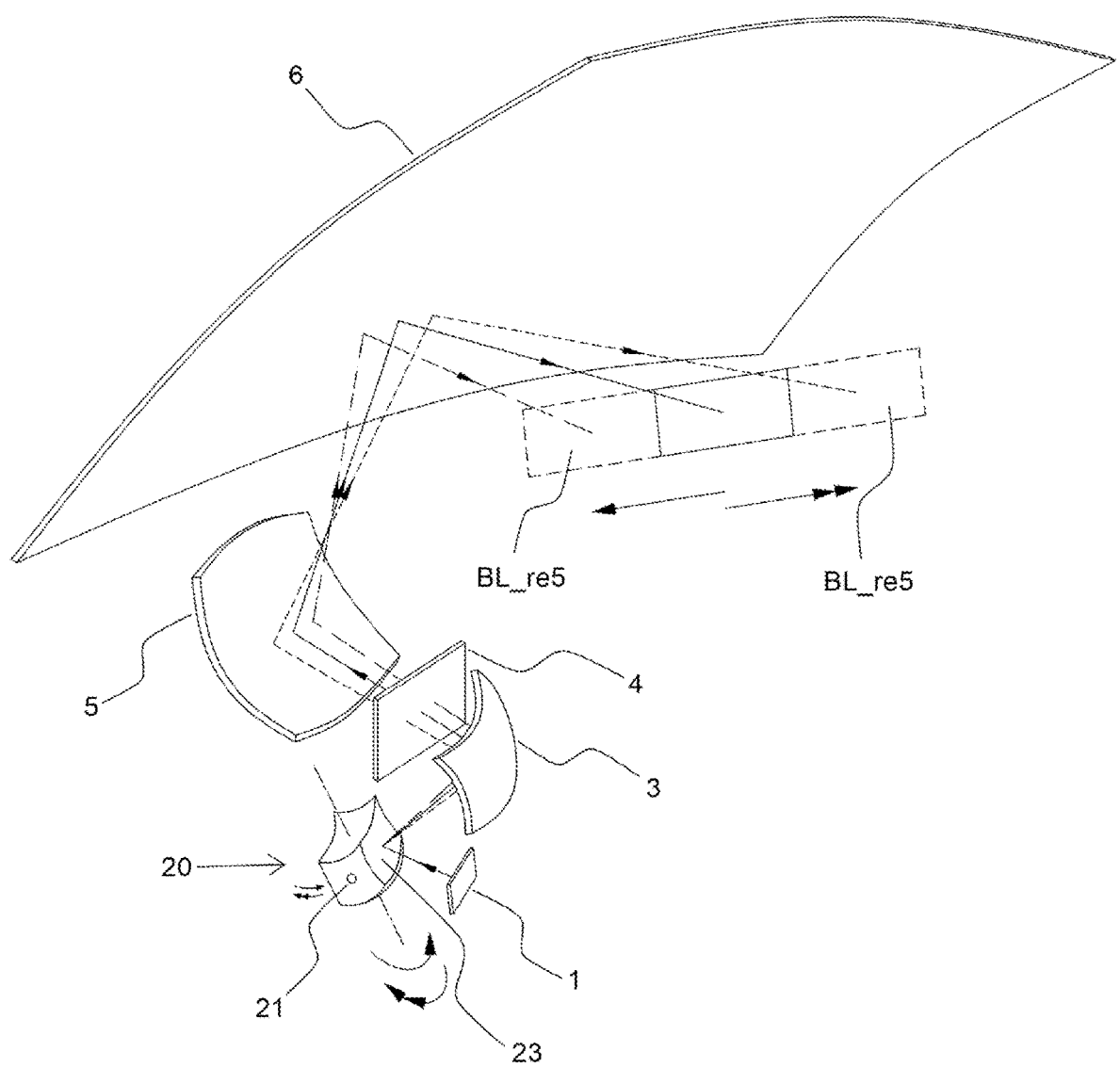
FIG. 25 is a schematic view showing the head-up display of FIG. 8 controlling the eyebox to move rightward and leftward.

As shown in FIG. 25, when the currently used mirror 23 of the roller type switchable adjustment mirror device 20 rotates rightward, the backlight source-based real image BL_re5 moves leftward, whereby under the condition where the light path does not exceed the effective acting range of each element, the eyebox can be moved toward the left side with the eyes of the viewer. On the contrary, when the currently used mirror 23 of the roller type switchable adjustment mirror device 20 rotates leftward, the backlight source-based real image BL_re5 moves rightward, whereby under the condition where the light path does not exceed the effective acting range of each element, the eyebox can be moved toward the right side with the eyes of the viewer.

Figure 26A:
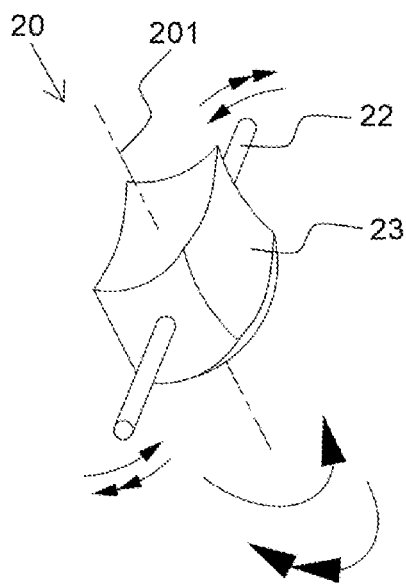
FIGS. 26A to 26D are schematic views showing the mirror of the roller type switchable adjustment mirror device being controlled to rotate rightward and leftward in different methods.
Figure 26B:
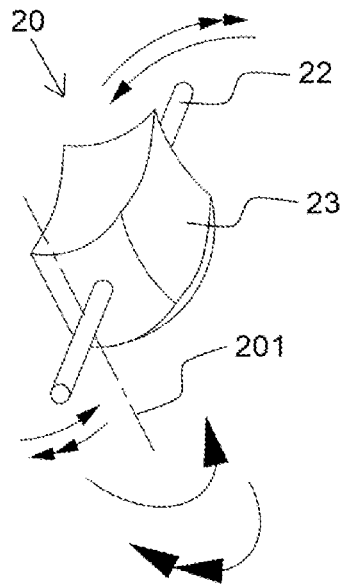
Figure 26C:
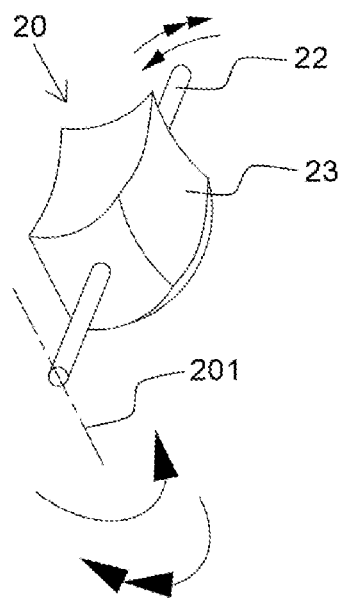
Figure 26D:
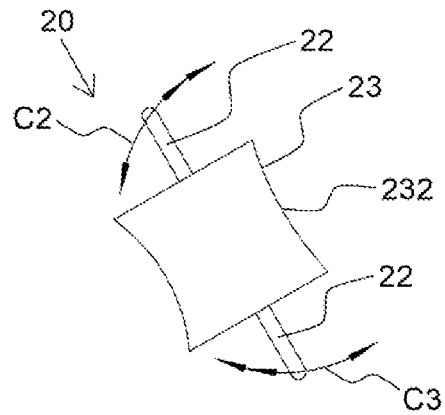
Figure 27:
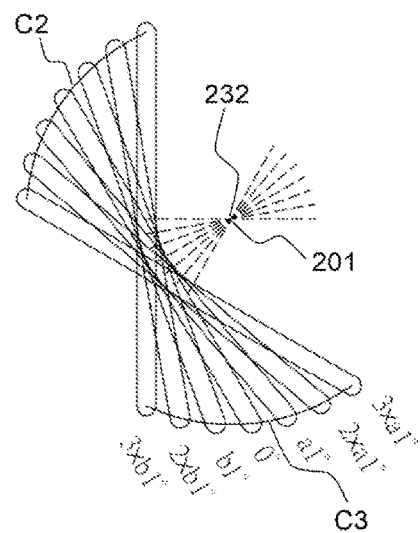
FIG. 27 is a schematic view showing the change of rotation angle of the mirror selected when the two opposite ends of the roller shaft of the roller type switchable adjustment mirror device of FIG. 26D respectively moves along the two shaft curves.

The leftward and rightward rotating directions of the mirror 23 and the leftward and rightward moving directions of the eyebox are not limited to be the same. In fact, the rotation directions of the mirror 23 and the eyebox can be different from each other as long as they have a linkage relationship therebetween. The leftward and rightward rotating method of the mirror 23 of the roller type switchable adjustment mirror 20 can be achieved by, for example: as shown in FIG. 26A, rotating the two opposite ends of the roller shaft 22 in two opposite directions at the same angular velocity respectively and maintaining the rotating axis 201 on the geometric center of the roller type switchable adjustment mirror device 20. Alternatively, as shown in 26B, it can be achieved by, for example, rotating the two opposite ends of the roller shaft 22 in two opposite directions at different angular velocities respectively and making the rotating axis 201 to deviate from the geometric center of the roller type switchable adjustment mirror device 20. Alternatively, as shown in FIG. 26C, it can be achieved by, for example, rotating the mirror 23 around one of the two opposite ends of the roller shaft 22 as the rotating axis 201. Alternatively, as shown in FIGS. 26D and 27, it can be achieved by, for example, moving the two opposite ends of the roller shaft 22 along the shaft curves C2 and C3 respectively and making the rotating axis 201 of the roller 21 to be fixed at the mirror center 232 of the mirror 23 during the leftward and rightward rotations of the roller 21. Therefore, the setting of the light path after reflection is not affected due to the change of angle.

Furthermore, the corresponding relationship between the angles of left and right rotating of the mirror 23 and the distance of left and right moving of the eyebox can be obtained via calculation, simulation or actual measurement.

Figure 28:
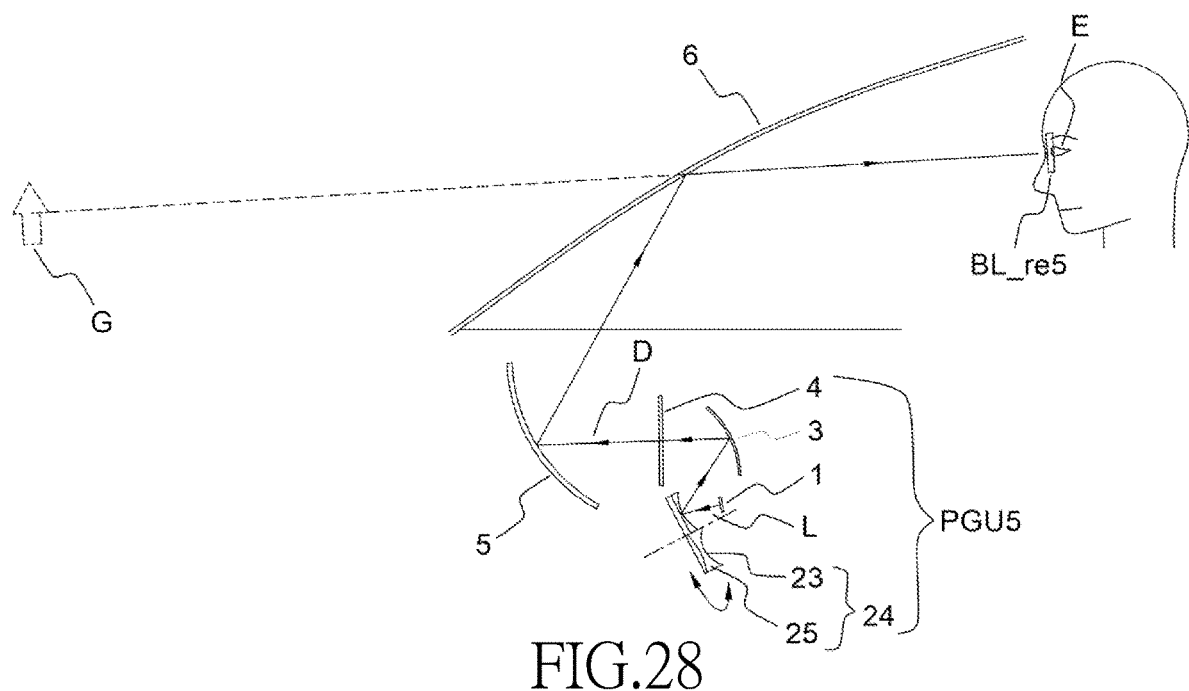
FIG. 28 is a schematic view showing the imaging of a head-up display with a turntable type switchable adjustment mirror device according to an embodiment of the present invention and showing an eyebox.
Figure 29:
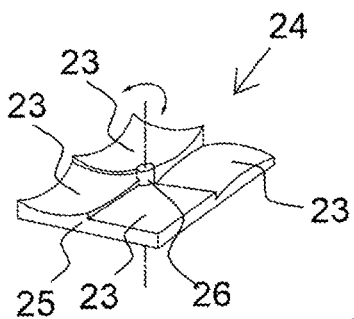
FIGS. 29 to 34 are schematic views showing a turntable type switchable adjustment mirror device according to different embodiments of the present invention respectively.

In addition, as shown in FIGS. 28 to 29, the switchable adjustment mirror device of the picture generation unit PGU5 of the head-up display is a turntable type switchable adjustment mirror device 24, which is an integrated switchable adjustment mirror device and includes a turntable 25, the turntable shaft 26 of the turntable 25, and a turntable driver rotatably connected to the turntable shaft 26. The turntable 25 includes four mirrors 23 of different curvatures. The head-up display is able to drive the turntable 25 to rotate via the turntable driver in order to switch the mirrors 23 of different curvatures, so that the backlight beam L from the backlight source 1 can be projected onto the selected mirror 23 and then be reflected by the selected mirror 23 to the backlight concave mirror 3.

The backlight concave mirror 3 then reflects the backlight beam L from the mirror 23 to the display panel 4. After the backlight beam L penetrates through the display panel 4, it becomes the image light beam D to reach the imaging concave mirror 5. The image light beam D is reflected by the imaging concave mirror 5 to the imaging semi-reflective mirror 6, and then is reflected to the eyes E of the viewer to form a display panel-based virtual image G at one side of the imaging semi-reflective mirror 6 away from the viewer and to form a backlight source-based real image BL_re5 at one side of the imaging semi-reflective mirror 6 close to the viewer.

In such a head-up display, the equivalent distance of the backlight source 1 changes as the backlight beam L is reflected by a respective mirror 23 of a different curvature. Accordingly, the change of the equivalent distance of the backlight source 1 can be used to control the position of the backlight source-based real image BL_re5, that is, control the horizontal position of the eyebox.

Figure 30:
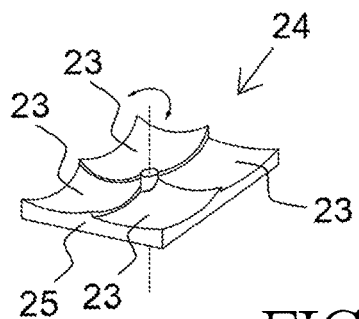
Figure 31:
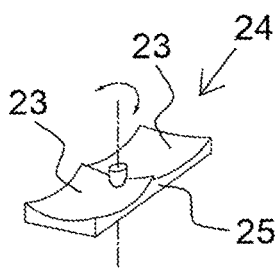
Figure 32:
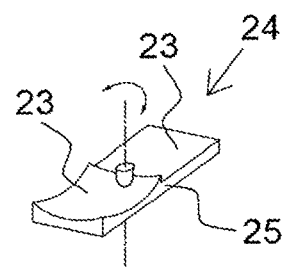
Figure 33:
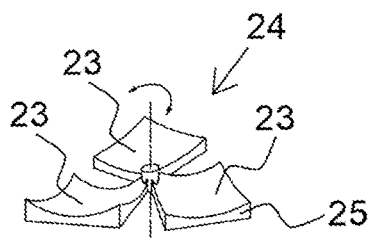
Figure 34:
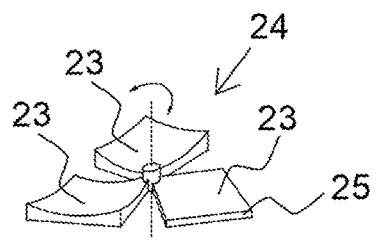

In the embodiment shown in FIGS. 28 to 29, in the four mirrors 23 on the turntable 25 of the turntable type switchable adjustment mirror device 24 include one plane mirror, one convex mirror, and two concave mirrors. However, the present invention is not limited to such a configuration. In another embodiment, for the four mirrors 23 on the turntable 25 of the turntable type switchable adjustment mirror device 24, the quantities of plane mirrors, convex mirrors and concave mirrors can have other arrangement combination, such as four concave mirrors as shown in FIG. 30. Alternatively, in another embodiment, the quantity of mirrors 23 on the turntable 25 of the turntable type switchable adjustment mirror device 24 can be modified to two mirrors as shown in FIGS. 31 and 32, modified to three mirrors as shown in FIGS. 33 and 34, modified to more than four mirrors. In addition, the respective mirror 23 can be a plane mirror, a convex mirror or a concave mirror.

The respective mirror 23 of the turntable type switchable adjustment mirror 24 can be a spherical mirror, an aspherical mirror or a freeform mirror. The curved surface type of mirror can be, such as a toroidal mirror, an elliptical mirror, an off-axis ellipsoidal mirror, a parabolical mirror, an off-axis parabolical mirror or a hyperbolic paraboloid mirror, having different curvatures in the X-axis and Y-axis. The curved surface shape of mirror can belong to, for example, a double concave curved mirror as shown in FIG. 18A, a double convex curved mirror as shown in FIG. 18B, a column concave mirror as shown in FIG. 18C, a column convex mirror as shown in FIG. 18D, or a saddle mirror as shown in FIG. 18E.

Figure 35:
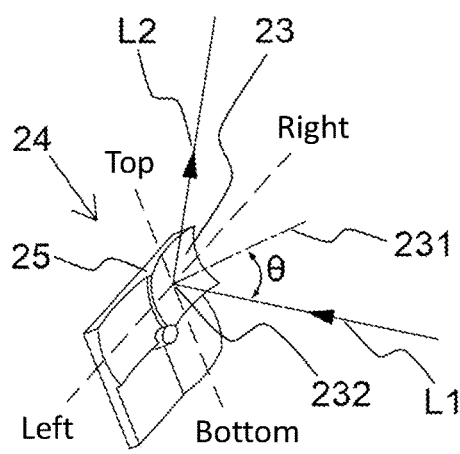
FIG. 35 is a schematic view showing different orientations of the mirror of the turntable type switchable adjustment mirror device according to an embodiment of the present invention.

The turntable type switchable adjustment mirror device 24 of the head-up display shown in FIG. 28 is used to exemplarily describe the operation scenarios of the head-up display of the present invention. To clearly define the rotating direction of the mirror 23, please refer to FIG. 35, the incident backlight light beam L1 is projected to the lens 23 and is reflected by the lens 23 to be emitted out as the output backlight light beam L2, and the angle θ between the incident backlight light beam L1 and the normal 231 of the lens center 232 is not zero degree. Under such a condition, the parallel component of the source direction of the incident backlight beam L1 is defined as the bottom, the parallel component of the emission direction of the output backlight beam L2 is defined as the top, the right hand side facing the mirror 23 is defined as the right side, the left hand side facing the mirror 23 is defined as the left side, the upward rotation of the mirror 23 means that the mirror 23 rotates toward the top, the downward rotation of the mirror 23 means that the mirror 23 rotates toward the bottom, the rightward rotation of the mirror 23 means that the mirror 23 rotates to the right side, and the leftward rotation of the mirror 23 means that the mirror 23 rotates to the left side.

<The Position of the Eyebox can be Adjusted Upward and Downward>

Similar to the roller type switchable adjustment mirror device, the mirror 23 of the turntable type switchable adjustment mirror device 24 can also be rotated upward and downward in order to adjust the vertical height of the eyebox, that is, adjust the position of the eyebox in the first axial direction perpendicular to the viewing direction.

Figure 36:
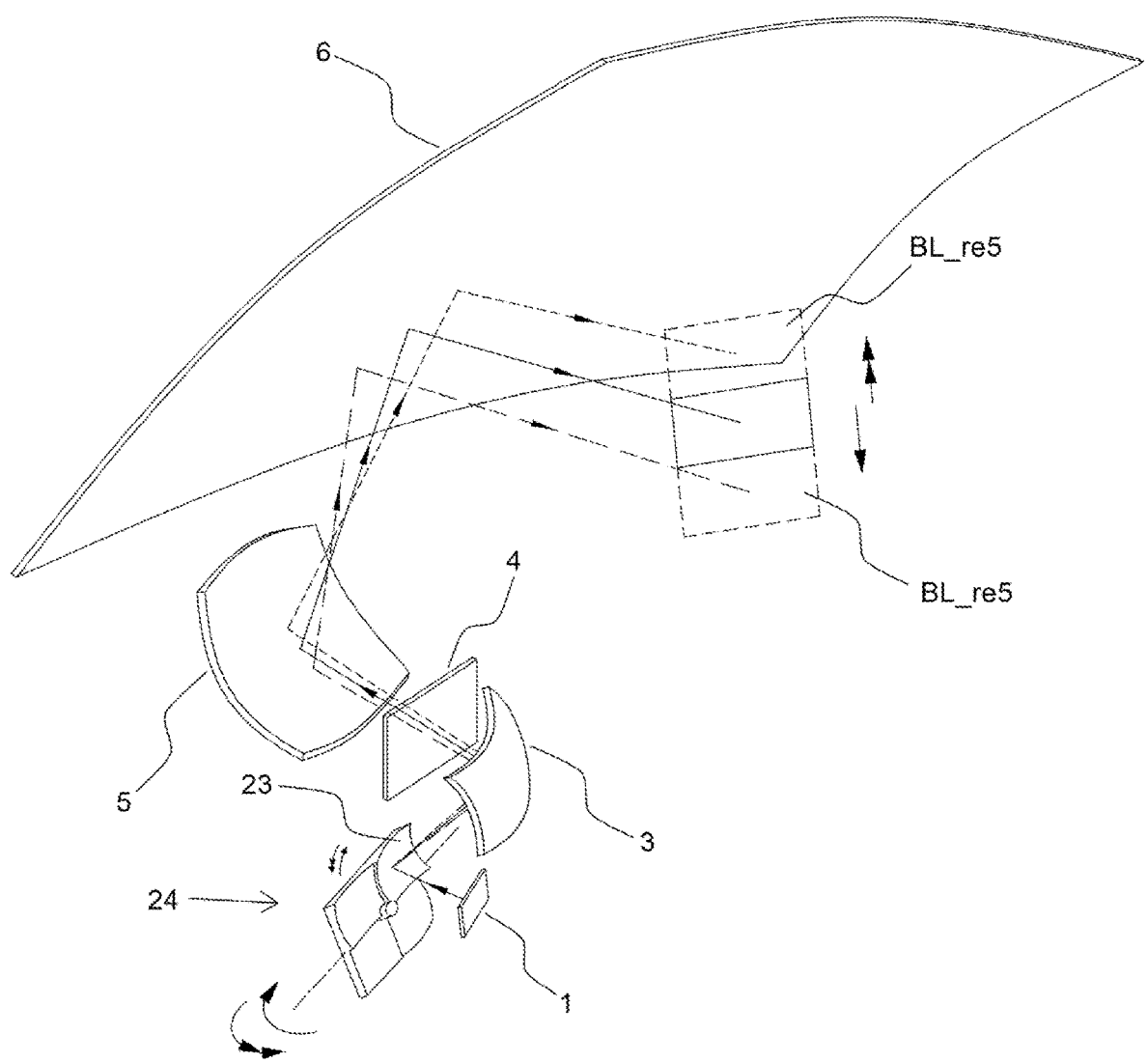
FIG. 36 is a schematic view showing the head-up display of FIG. 28 controlling the eyebox to move rightward and leftward.

As shown in FIG. 36, when the currently used mirror 23 of the turntable type switchable adjustment mirror device 24 rotates downward, the backlight source-based real image BL_re5 moves downward, whereby under the condition where the light path does not exceed the effective acting range of each element, the eyebox can be moved toward the bottom with the eyes of the viewer. On the contrary, when the currently used mirror 23 of the turntable type switchable adjustment mirror device 24 rotates upward, the backlight source-based real image BL_re5 moves upward, whereby under the condition where the light path does not exceed the effective acting range of each element, the eyebox can be moved toward the top with the eyes of the viewer.

The upward and downward rotating directions of the mirror 23 and the linkage moving direction of the eyebox are not limited to be the same. In fact, the rotating direction of the mirror 23 and the moving direction of the eyebox can be different from each other as long as they have a linkage relationship therebetween.

The upward and downward rotating method of the mirror 23 of the turntable type switchable adjustment mirror 24 can be achieved by for example: as shown in FIG. 37A, rotating the two opposite ends of the turntable shaft 26 in two opposite directions at the same angular velocity respectively, and maintaining the rotating axis 202 to be on the geometric center of the turntable 25. Alternatively, as shown in 37B, it can be achieved by rotating the two opposite ends of the turntable shaft 26 in two opposite directions at different angular velocities respectively, and making the rotating axis 202 to deviate from the geometric center of the turntable 25. Alternatively, as shown in FIG. 37C, it can be achieved by rotating the mirror 23 around one of the two opposite ends of the turntable shaft 26 as the rotating axis 202. Alternatively, as shown in FIGS. 37D and 37E, it can be achieved by moving the two opposite ends of the turntable shaft 26 along the shaft curves C4 and C5 respectively, and making the rotating axis 202 of the turntable 25 to be fixed at the mirror center 232 of the mirror 23 during the upward and downward rotations of the turntable 25, such that the setting of the light path after reflection is not affected due to the change of angle.

<The Position of the Eyebox can be Adjusted Leftward and Rightward>

Similar to the adjustment of the vertical height of the eyebox, the mirror 23 of the turntable type switchable adjustment mirror device 24 can also be rotated leftward and rightward in order to adjust the position of the eyebox to the right and left sides, that is, change the position of the eyebox in the second axial direction perpendicular to the viewing direction.

Figure 38:
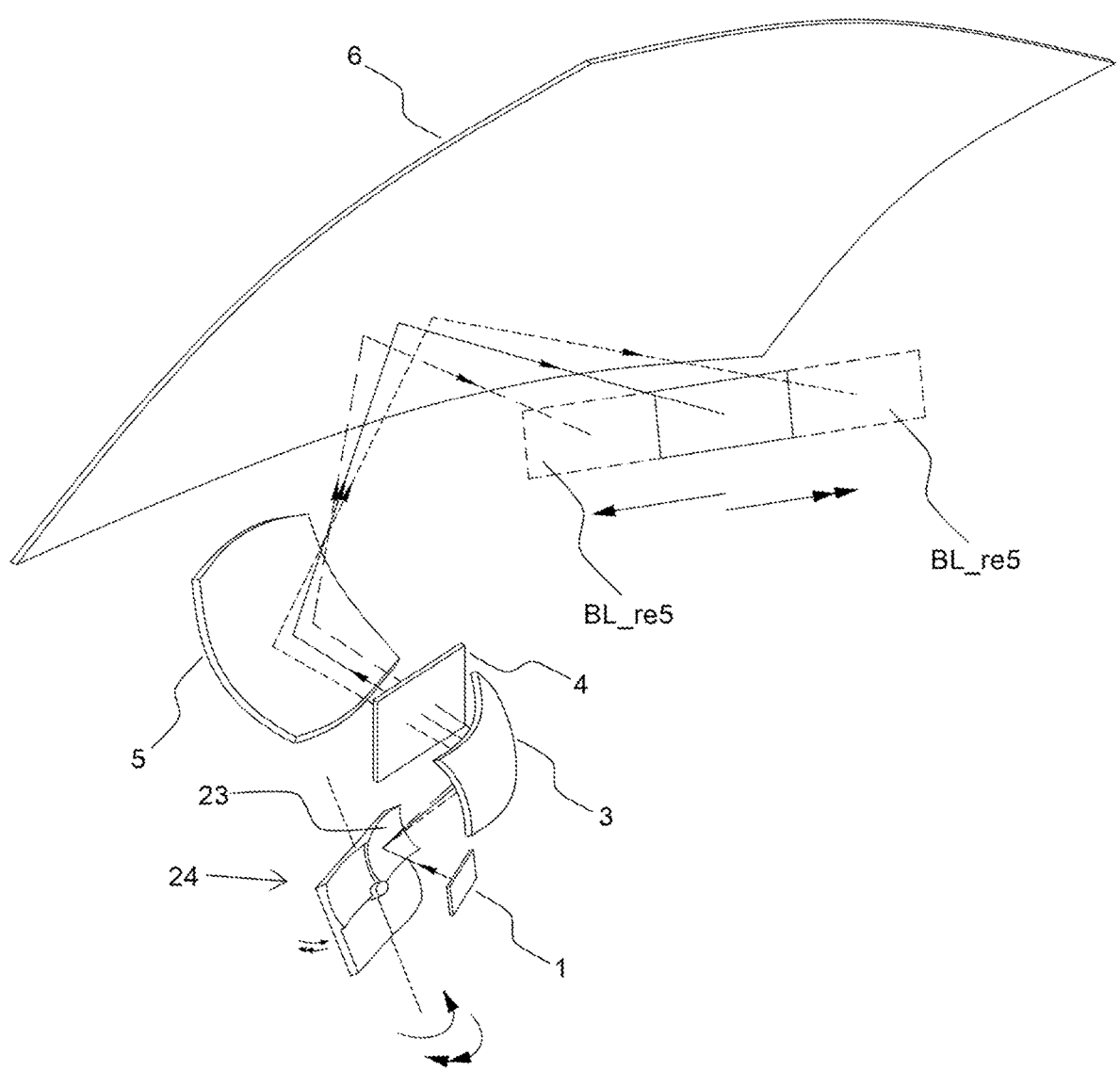
FIG. 38 is a schematic view showing the head-up display of FIG. 28 controlling the eyebox to move rightward and leftward.

As shown in FIG. 38, when the currently used mirror 23 of the turntable type switchable adjustment mirror device 24 rotates rightward, the backlight source-based real image BL_re5 moves leftward, whereby under the condition where the light path does not exceed the effective acting range of each element, the eyebox can be moved toward the left side with the eyes of the viewer. On the contrary, when the currently used mirror 23 of the turntable type switchable adjustment mirror device 24 rotates leftward, the backlight source-based real image BL_re5 moves rightward, whereby under the condition where the light path does not exceed the effective acting range of each element, the eyebox can be moved toward the right side with the eyes of the viewer.

Figure 39A:
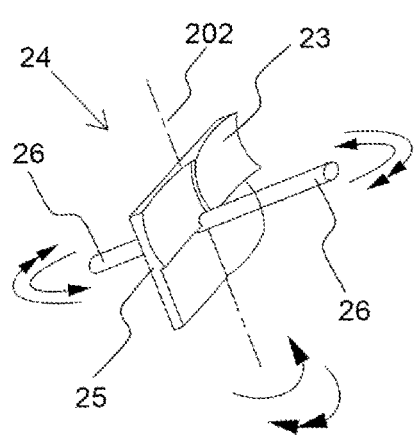
FIGS. 39A to 39D are schematic views showing the mirror of the turntable type switchable adjustment mirror device being controlled to rotate rightward and leftward in different methods.
Figure 39B:
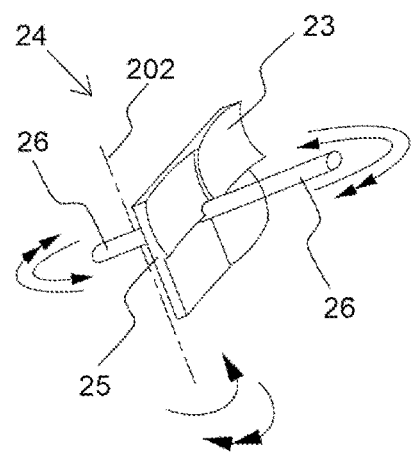
Figure 39C:
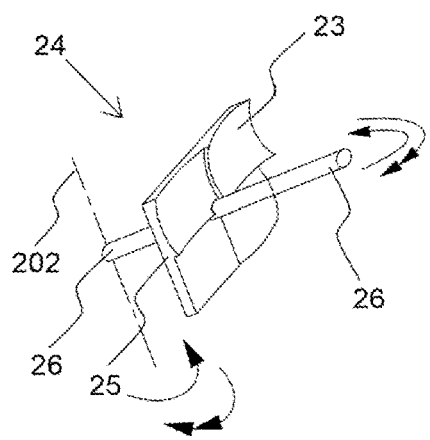
Figure 39D:
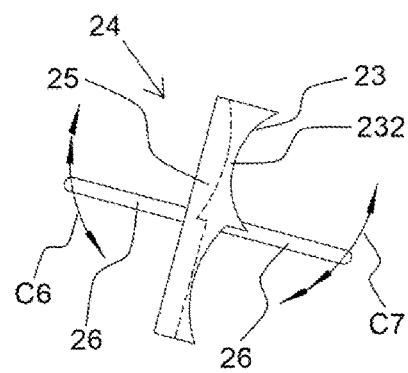
Figure 39E:
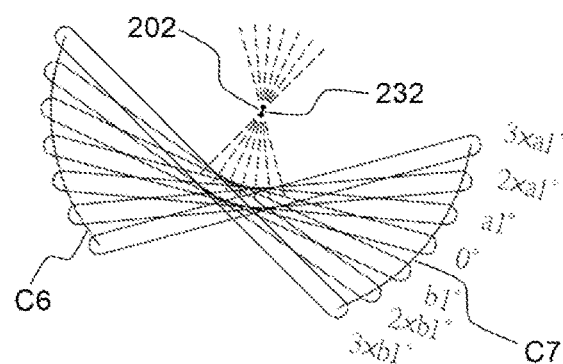
FIG. 39E is a schematic view showing the change of rotation angle of the mirror selected when the two opposite ends of the turntable shaft of the turntable type switchable adjustment mirror device of FIG. 39D respectively moves along the two shaft curves.

For the left and right rotating method of the mirror 23 on the turntable 25 of the turntable type switchable adjustment mirror 24, it can be achieved by, for example: as shown in FIG. 39A, rotating the two opposite ends of the turntable shaft 26 in two opposite directions at the same angular velocity respectively, and maintaining the rotating axis 202 on the geometric center of the turntable type switchable adjustment mirror device 24. Alternatively, as shown in 39B, it can be achieved by rotating the two opposite ends of the turntable shaft 26 in two opposite directions at different angular velocities respectively, and making the rotating axis 202 to deviate from the geometric center of the turntable type switchable adjustment mirror device 24. Alternatively, as shown in FIG. 39C, it can be achieved by rotating the mirror 23 around one of the two opposite ends of the turntable shaft 26 as the rotating axis 202. Alternatively, as shown in FIGS. 39D and 39E, it can be achieved by moving the two opposite ends of the turntable shaft 26 along the shaft curves C6 and C7 respectively, and making the rotating axis 202 of the turntable 25 to be fixed at the mirror center 232 of the mirror 23 during the left and right rotations of the turntable 25, such that the setting of the light path after reflection is not affected due to the change of angle.

The rotating direction of the mirror 23 and the linkage moving direction of the eyebox are not limited to be the same. In fact, the rotating direction of the mirror 23 and the linkage moving direction of the eyebox can be different from each other as long as they have a linkage relationship therebetween. The corresponding relationship between the rotating angle of the mirror 23 and the moving distance of the eyebox can be obtained via calculation, simulation or actual measurement.

In view of the above, the head-up display of the present invention utilizes the switchable adjustment mirror device that is capable of selectively switching the mirrors of different curvatures and is arranged on the light path between the backlight source and the display panel, to reflect the backlight beam projected by the backlight source, by a mirror of an appropriate curvature, thereby changing the equivalent distance of the backlight source to control the eyebox to move forward and backward with the eyes of the viewer. As a result, the quality of the image viewed by the viewer can be maintained, and the space required can be saved.

The head-up display of the present invention allows the currently selected mirror of the switchable adjustment mirror device to rotate upward, downward, rightward and leftward, in order to precisely and adaptively control the eyebox to move upward and downward in the first axial direction and move rightward and leftward in the second axial direction with the eyes of the viewer, and to maintain the integrity of the image viewed by the viewer. The first axial direction is perpendicular to the second axial direction.

The head-up display of the present invention integrates a plurality of mirrors of different curvatures to the roller or turntable, in order to increase the efficiency of switching and selection of the mirrors while reducing the overall size of the head-up display and increasing the space utilization rate.

Although the aforementioned embodiments are used to describe the present invention, such embodiments are provided for illustrative purpose only such that they shall not be used to limit the scope of the present invention. Within the principle and scope of the present invention, any changes, modifications and combinations of various embodiments shall be considered to be within the scope of the claims of the present invention. For the scope of the present invention, please refer to the accompanied claims.

What is claimed is:

1. A head-up display, using backlight to control an eyebox, applicable to being used with an imaging semi-reflective mirror, and comprising:
   a backlight source for projecting a backlight beam;
   a switchable adjustment mirror device, comprising a plurality of mirrors having different curvatures, and each one of the plurality of mirrors configured to be selectable to reflect the backlight beam from the backlight source;
   a backlight concave mirror arranged to reflect the backlight beam reflected by one of the plurality of mirrors;
   a display panel arranged to display an image and to allow the backlight beam reflected by the backlight concave mirror, to penetrate therethrough in order to form an image light beam; and
   an imaging concave mirror arranged to reflect the image light beam to the imaging semi-reflective mirror, in order to form a display panel-based virtual image at one side of the imaging semi-reflective mirror away from a viewer and to form a backlight source-based real image at one side of the imaging semi-reflective mirror close to the viewer and positioned at eyes of the viewer, and the backlight source-based real image being the eyebox.

2. The head-up display using backlight to control the eyebox according to claim 1, wherein the imaging semi-reflective mirror is a windshield or a combiner for partially reflecting the image light beam from the imaging concave mirror to the eyes of the viewer while allowing a portion of front scenery light to penetrate therethrough to reach the eyes of the viewer at the same time.

3. The head-up display using backlight to control the eyebox according to claim 1, wherein the switchable adjustment mirror device further comprises a roller, the roller includes the plurality of mirrors arranged thereon, and the roller is configured to rotate in order to allow the backlight beam from the backlight source to be projected onto one of the plurality of mirrors.

4. The head-up display using backlight to control an eyebox according to claim 3, wherein at least one end of a roller shaft of the roller is movable along a shaft curve.

5. The head-up display using backlight to control the eyebox according to claim 1, wherein the switchable adjustment mirror device further comprises a turntable, the turntable includes the plurality of mirrors arranged thereon, and the turntable is configured to rotate in order to allow the backlight beam from the backlight source to be projected onto one of the plurality of mirrors.

6. The head-up display using backlight to control an eyebox according to claim 5, wherein at least one end of a turntable shaft of the turntable is movable along a shaft curve.

7. The head-up display using backlight to control the eyebox according to claim 1, wherein the plurality of mirrors comprises at least one curved mirror, or at least one plane mirror, or comprises at least one curved mirror and at least one plane mirror.

8. The head-up display using backlight to control the eyebox according to claim 7, wherein the curved mirror is a spherical mirror, an aspherical mirror or a freeform mirror.

9. The head-up display using backlight to control the eyebox according to claim 1, wherein an orientation of each one of the plurality of mirrors is adjustable in order to determine a position of the eyebox in a first axial direction and a second axial direction, the first axial direction is perpendicular to the second axial direction, and both the first axial direction and the second axial direction are perpendicular to a viewing direction of the viewer.

* * * * *